(12) United States Patent
Takahashi et al.

(10) Patent No.: US 7,868,266 B2
(45) Date of Patent: Jan. 11, 2011

(54) SPOT WELDING SYSTEM AND METHOD FOR ADJUSTING WELDING-GUN CLOSING SPEED

(75) Inventors: Hiromitsu Takahashi, Yamanashi (JP); Toshimichi Aoki, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 391 days.

(21) Appl. No.: 12/137,924

(22) Filed: Jun. 12, 2008

(65) Prior Publication Data

US 2008/0308533 A1 Dec. 18, 2008

(30) Foreign Application Priority Data

Jun. 14, 2007 (JP) .............................. 2007-157984

(51) Int. Cl.
  *B23K 11/00* (2006.01)
(52) U.S. Cl. ................. 219/117.1; 219/86.1; 219/86.41; 219/86.51; 219/91.2
(58) Field of Classification Search ................. 219/86.1, 219/86.23, 86.25, 86.41, 86.61, 91.2, 117.1, 219/86.51
See application file for complete search history.

(56) References Cited

U.S. PATENT DOCUMENTS

2005/0082340 A1* 4/2005 Wiedemann et al. ........ 228/103

FOREIGN PATENT DOCUMENTS

JP 6-312273 11/1994

* cited by examiner

*Primary Examiner*—Stephen J Ralis
(74) *Attorney, Agent, or Firm*—Drinker Biddle & Reath LLP

(57) ABSTRACT

Spot welding system including a welding gun with an electrode pair actuated by a servo-motor, a robot carrying the welding gun or objective workpieces and operating to change an relative positions and orientations of the welding gun and an workpieces, and a gun motion controller controlling the servo-motor to actuate the electrode pair. The gun motion controller includes a motion commanding section outputting motion commands to the servo-motor in accordance with a speed set-value designating a closing speed of the electrode pair, and a set-value adjusting section automatically adjusting the speed set-value to an appropriate value. The set-value adjusting section includes a force-data obtaining section obtaining force data representing, in a time-series manner, the pressurizing force generated in the electrode pair when the servo-motor actuates the electrode pair to close, and an appropriate-value computing section determining the appropriate value of the speed set-value based on pre-convergence transient data in the force data.

13 Claims, 14 Drawing Sheets

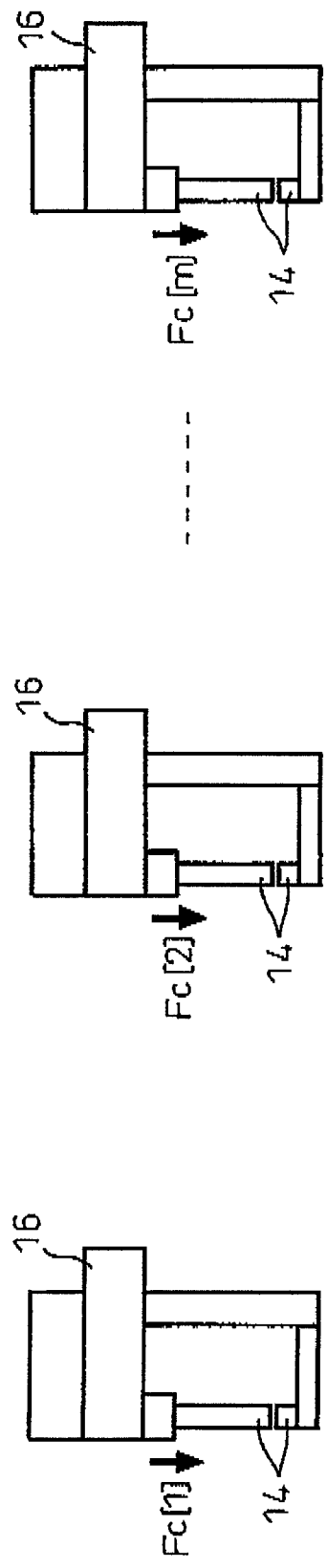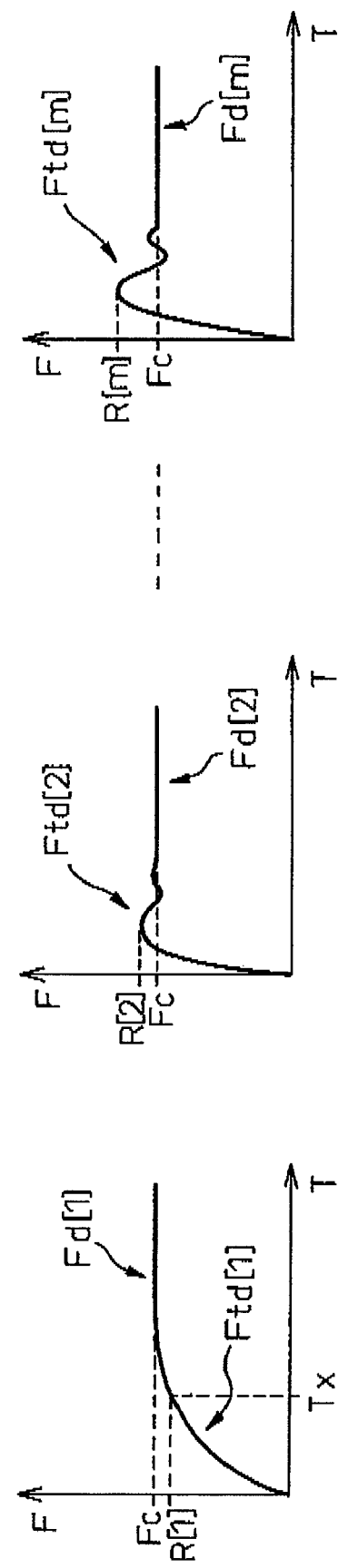
Fig.12

SPOT WELDING SYSTEM AND METHOD FOR ADJUSTING WELDING-GUN CLOSING SPEED

BACKGROUND OF THE INVENTION

1. Field of the Invention

The present invention relates to a spot welding system including a robot. The present invention also relates to a method for adjusting a closing speed of a welding gun, which can be performed in the spot welding system.

2. Description of the Related Art

Spot welding is known as a type of resistance welding technique, in which a plurality of objective workpieces to be welded, are placed on each other and held between a pair of electrodes (referred to as "an electrode pair" in this application) of a welding gun, and a predetermined current is applied to the held points of the objective workpieces during a predetermined period while applying a predetermined pressurizing force to the held points, so as to obtain a weld of a desired quality. The welding gun is typically configured such that a movable-side electrode is actuated to open or close with respect to a stationary-side electrode, and in recent years, a servo-motor tends to be used frequently as a driving source for the movable electrode. Further, the spot welding system applied to an automobile assembly process, etc., has typically adopted a robot system configuration in which the welding gun as a working tool (i.e., an end effector) is attached to a distal end of an arm structure (i.e., a manipulator) of an industrial robot having an articulated or other configuration (simply referred to as a "robot" in this application), so as to quickly and accurately weld a plurality of junction points on the objective workpieces while following their various positions and orientations. Alternatively, when the objective workpieces are relatively small, another system configuration has also been adopted, in which a robot grips objective workpieces by a hand and operates variously with respect to a welding gun disposed in a stationary state, so as to sequentially locate a plurality of junction points at a predetermined welding position.

When attempting to hold objective workpieces between an electrode pair of a welding gun by a target pressurizing force, it is important to appropriately adjust a moving speed (referred to as a "closing speed" in this application) of a movable electrode in a direction of a closing motion of the electrode pair, in terms of improving quality of a weld point and reducing a cycle time of a welding process. For example, if the closing speed of the movable electrode is too fast, an overshoot of a pressurizing force applied to the objective workpieces may become too large and thus a welding current may start to be applied in a state where the pressurizing force is not yet sufficiently stabilized at the target value, and, as a result, a welding quality may be degraded. Further, in this case, the welding gun and the objective workpieces may be damaged. On the other hand, if the closing speed of the movable electrode is too slow, the time required for the pressurizing force applied to the objective workpieces to reach the target value may become longer, and thus a welding current may start to be applied in a state where the pressurizing force is insufficient, and also welding quality may be degraded. In either case, a certain level of welding quality can be ensured by configuring the system in such a manner that the welding current starts to be applied after the pressurizing force is stabilized at the target value, but a problem of increasing cycle time may arise.

The above-described adjustment of the closing speed of the electrode pair in the welding gun is conventionally performed for respective welding guns manually by an operator. More specifically, while using a pressure sensor for sensing the pressurizing force between the electrodes, an operator monitors an output waveform of the pressure sensor when actually actuating the electrode pair to close, and manually and finely tunes the closing speed through a trial and error so that the overshoot with respect to the target pressurizing force can fall within an tolerable range. However, due to the fact that the welding gun, even of an identical type, typically has an individual structural difference in, for example, friction of moving parts, rigidity of components, etc., and a single welding gun is subjected to a deterioration with age in characteristics such as an electrode wear, etc., and therefore, in the above-described closing-speed adjusting technique by the manual work, there are problems in that excessive burdens are imposed on the operator and significant time is required to start up the system.

In this connection, in a welding gun with an electrode pair actuated by a servo-motor as a drive source, a pressurizing-force control method capable of appropriately control a pressurizing force has been conventionally proposed, in which, in addition to the control of a motor current, a protruding amount of the movable electrode (i.e., a pushing amount relative to the stationary electrode) is automatically corrected based on an actual pressurizing force generated between the electrodes (see Japanese Unexamined Patent Publication (Kokai) No. 6-312273 (JP-A-6-312273)). In the pressurizing force control method as set forth in JP-A-6-312273, the movable electrode is decelerated, during a closing motion of the electrode pair, from a position sufficiently short of a contact position relative to the objective workpieces so as to contact with the objective workpieces at a low speed, and thereby the pressurizing force is controlled to ensure that "the contact is always performed from an undershoot direction". Then, by using a detection value of the motor current, the actual pressurizing force generated between the electrode pair is monitored, and if the actual pressurizing force does not reach a set value (or a target value) even after a predetermined time has elapsed after the start of monitoring, the protruding amount (or the target position) of the movable electrode is corrected to compensate the deviation of the pressurizing force. According to this technique, collision between the electrode pair and the objective workpieces can be reduced, and the appropriate pressurizing force can be ensured, as occasion demands correspondingly to the wear of the electrodes.

The pressurizing force control method for the welding gun, as set forth in JP-A-6-312273, has a configuration wherein the pressurizing force is controlled in such a manner as to always exhibit an undershoot response pattern, by making the movable electrode contact with the objective workpieces at a low speed, and therefore, time required to stabilize the pressurizing force tends to increase and, as a result, the welding quality may be degraded or the welding cycle time may be increased as described above. The above method also has a configuration wherein the protruding amount (or the target position) of the movable electrode is corrected based on a judgment about convergence (i.e., a judgement concerning whether the actual pressurizing force reaches the set value ox not) performed after a predetermined time has elapsed from the start of the monitoring of the actual pressurizing force (i.e., in a steady state), and therefore, time required to control the pressurizing force may also increase. Further, in the correction of the protruding amount of the movable electrode, a position command is computed while considering the deflection of components provided for the stationary electrode, and therefore, it is required to prepare data of respective welding guns for accommodating the individual structural difference thereof, which makes a system starting-up work complicated.

SUMMARY OF THE INVENTION

It is an object of the present invention to provide a spot welding system including a robot, which can S automatically and readily adjust a closing speed of an electrode pair to an appropriate value, while accommodating the individual structural difference ox characteristic deterioration with age of a welding gun, and thereby can ensure the improvement of welding quality, and the reduction of a welding cycle time, and can also achieve the simplification and acceleration of a system starting-up work.

It is another object of the present invention to provide a closing-speed adjusting method for a welding gun capable of being performed in a spot welding system, which can automatically and readily adjust a closing speed of an electrode pair to an appropriate value, while accommodating the individual structural difference or characteristic deterioration with age of a welding gun, and thereby can ensure the improvement of welding quality, and the reduction of a welding cycle time, and can also achieve the simplification and acceleration of a system starting-up work.

To accomplish the above object, one aspect of the present invention provides a spot welding system comprising a welding gun provided with an electrode pair actuated, to open or close, by a servo-motor as a drive source; a robot carrying either one of the welding gun and a workpiece to be welded, and operating to change relative positions and orientations of the welding gun and the workpiece; and a gun motion controller controlling the servo-motor to actuate the electrode pair of the welding gun to open or close; the gun motion controller comprising a motion commanding section outputting a motion command to the servo-motor in accordance with a speed set-value designating a closing speed of the electrode pair, so as to allow a pressurizing force exerted by the electrode pair on the workpiece to converge into a previously designated force target-value; and a set-value adjusting section automatically adjusting the speed set-value given to the motion commanding section to an appropriate value; the set-value adjusting section comprising a force-data obtaining section obtaining force data representing, in a time-series manner, the pressurizing force generated in the electrode pair when the servo-motor actuates the electrode pair to close in accordance with the motion command from the motion commanding section; and an appropriate-value computing section determining the appropriate value of the speed set-value based on pre-convergence transient data in the force data obtained by the force-data obtaining section.

In the above configuration, the appropriate-value computing section may comprise a representative-value calculating section calculating, from the transient data in the force data obtained by the force-data obtaining section, a representative value typically representing a response pattern of the transient data; a comparing and judging section comparing the representative value calculated by the representative-value calculating section with a representative-value tolerable range previously prepared with reference to the force target-value and judging that, when the representative value is included within the representative-value tolerable range, the speed set-value is the appropriate value and, when the representative value is not included within the representative-value tolerable range, the speed set-value is an inappropriate value; and a regulating section acting, based on a judgment of the comparing and judging section, to terminate, when the speed set-value is judged as the appropriate value, an automatic adjusting process for the speed set-value, and to determine, when the speed set-value is judged as the inappropriate value, a second speed set-value different from the speed set-value judged as the inappropriate value and give the second speed set-value to the motion commanding section.

In the above configuration, the force-data obtaining section may obtain mutually different several sets of the force data respectively representing, in a time-series manner, the pressurizing force generated in the electrode pair when the motion commanding section puts the servo-motor into operation to actuate the electrode pair to close in accordance with mutually different several speed set-values previously prepared in connection with a single force target-value; and the appropriate-value computing section may comprise a representative-value calculating section calculating, from several sets of the transient data respectively in the several sets of force data obtained by the force-data obtaining section, several representative values respectively and typically representing response patterns of the several sets of transient data; a function calculating section calculating a force/speed curve approximately representing a correlativity between the several representative values calculated by the representative-value calculating section and the several speed set-values respectively corresponding to the several representative values; and an appropriate-value determining section determining an applicable speed set-value as the appropriate value, by using the force/speed curve calculated by the function calculating section, the applicable speed set-value corresponding to an optimal representative value previously prepared with reference to the force target-value, and giving the applicable speed set-value to the motion commanding section.

The above spot welding system may further comprise a disturbance observer estimating a disturbance torque applied to the servo-motor, based on a control current value given to the servo-motor and an actual speed measurement value obtained from the servo-motor when the servo-motor actuates the electrode pair to close in accordance with the motion command of the motion commanding section. In this case, the force-data obtaining section may obtain, as the force data, time-series data of the disturbance torque estimated by the disturbance observer.

The above spot welding system may further comprise a pressure sensor sensing an actual pressurizing force generated in the electrode pair when the servo-motor actuates the electrode pair to close in accordance with the motion command of the motion commanding section. In this case, the force-data obtaining section may obtain time-series data of the actual pressurizing force sensed by the pressure sensor as the force data.

The above spot welding system may further comprise a robot controller for controlling the robot. In this case, the gun motion controller may comprise a part of functions of the robot controller.

Another aspect of the present invention provides a method for adjusting a closing speed of an electrode pair provided in a welding gun, the electrode pair actuated, to open or close, by a servo-motor as a drive source, the method comprising preparing a speed set-value designating a closing speed of the electrode pair; putting the servo-motor into operation to actuate the electrode pair to close, in accordance with the speed set-value; obtaining force data representing, in a time-series manner, a pressurizing force generated in the electrode pair when the servo-motor actuates the electrode pair to close; and determining an appropriate value of the speed set-value based on pre-convergence transient data in the force data.

BRIEF DESCRIPTION OF THE DRAWINGS

The above and other objects, features and advantages of the present invention will become more apparent from the following description of preferred embodiments in connection with the accompanying drawings, wherein:

FIG. 12 is an illustration explaining an example of a technique for determining an applicable speed set-value in the closing-speed automatic adjusting process of FIG. 11;

DETAILED DESCRIPTION

Figure 1:
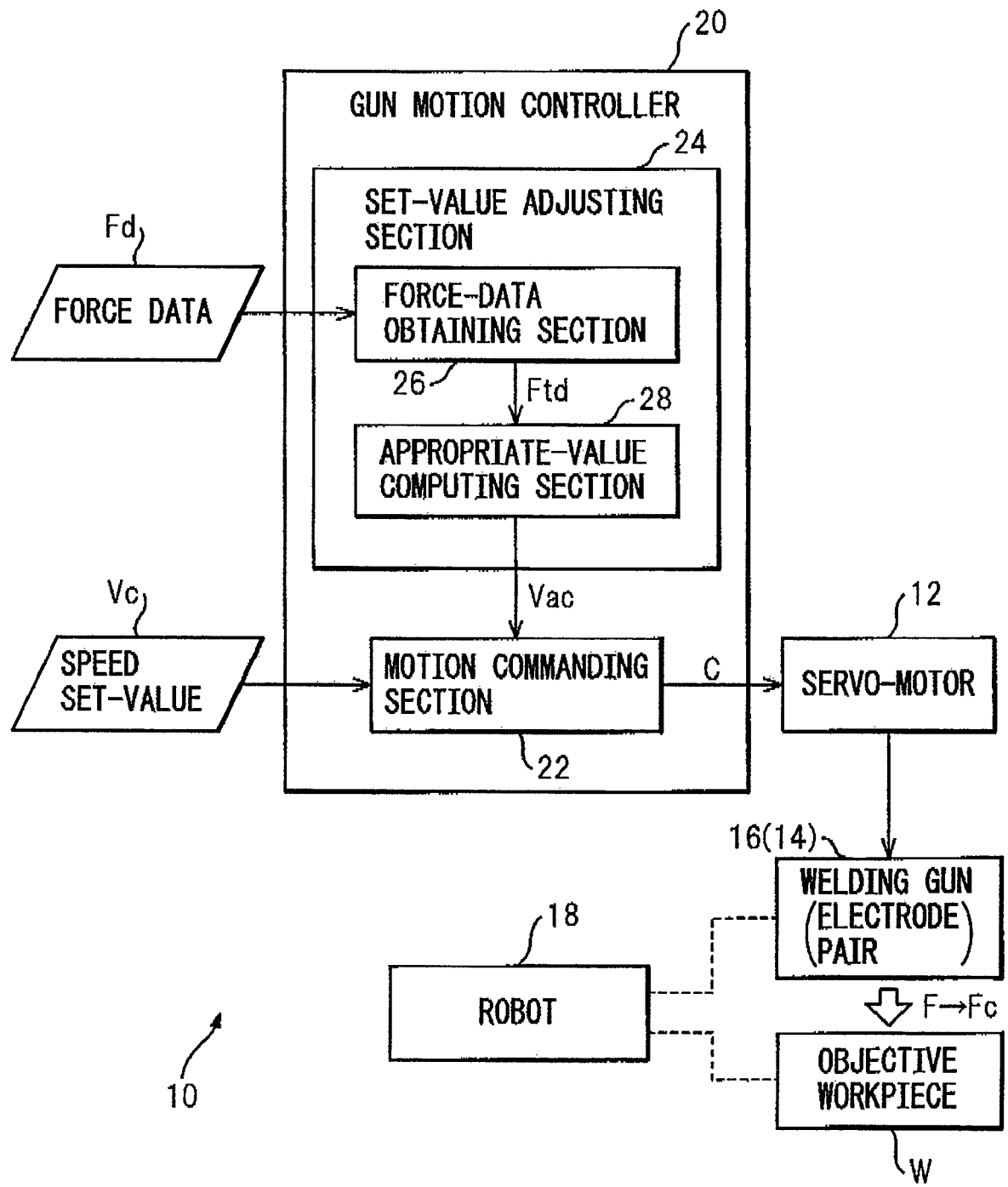
FIG. 1 is a functional block diagram showing a basic configuration of a spot welding system according to the present invention.

The embodiments of the present invention are described below, in detail, with reference to the accompanying drawings. In the drawings, the same or similar components are denoted by common reference numerals.

Referring to the drawings, FIG. 1 shows, by a functional block diagram, a basic configuration of a spot welding system 10 according to the present invention. FIGS. 2 to 6 show several exemplary configurations of the spot welding system 10.

As shown in FIG. 1, the spot welding system 10 includes a welding gun 16 that has an electrode pair 14 (i.e., a pair of electrodes) actuated, to open or close, by a servo-motor 12 as a drive source; a robot 18 that carries either one of the welding gun 16 and objective workpieces W to be welded and operates to change relative positions and orientations of the welding gun 16 and the objective workpieces W; and a gun opening/closing motion controller 20 that controls the servo-motor 12 to actuate the electrode pair 14 of the welding gun 16 to open or close. The gun motion controller 20 includes a motion commanding section 22 that outputs a motion command C to the servo-motor 12 in accordance with a speed set-value Vc designating a closing speed of the electrode pair 14, so as to allow a pressurizing force F exerted by the electrode pair 14 on the objective workpieces W to converge into a previously designated force target-value Fc; and a set-value adjusting section 24 that automatically adjusts the speed set-value Vc, given to the motion commanding section 22, to an appropriate value Vac. The set-value adjusting section 24 includes a force-data obtaining section 26 that obtains force data Fd representing, in a time-series manner, the pressurizing force F generated in the electrode pair 14 when the servo-motor 12 actuates the electrode pair 14 to close in accordance with the motion command C from the motion commanding section 22; and an appropriate-value computing section 28 that determines the appropriate value Vac of the speed set-value Vc based on pre-convergence transient data Ftd (i.e., data showing a state of force before completion of convergence) in the force data Fd obtained by the force-data obtaining section 26.

In the spot welding system 10 configured as described above, the set-value adjusting section 24 of the gun motion controller 20 automatically adjusts the speed set-value Vc, designating the closing speed of the electrode pair 14 for the motion commanding section 22, to the appropriate value Vac, and therefore, an operator does not have to manually adjust the closing speed. The set-value adjusting section 24 is also configured such that the force-data obtaining section 26 obtains the force data Fd representing, in a time-series manner, the pressurizing force F actually generated in the electrode pair 14 of the welding gun 16 accordingly to the motion command D of the motion commanding section 22 and, based on the force data Fd, the appropriate-value computing section 28 determines the appropriate value Vac of the speed set-value Vc, so that the closing-speed automatic adjustment by the gun motion controller 20 can ensure and exhibit a function comparable to that in a conventional technique wherein an operator monitors an actual inter-electrode pressurizing force through an output waveform of a pressure sensor. Therefore, without the need fox cumbersome work by the operator to manually fine-tune the closing speed of the electrode pair through a trial and error, the closing speed of the electrode pair 14 can be automatically adjusted to the appropriate value Vac as occasion demands, regardless of types of the welding gun 16, while accommodating the individual structural difference (e.g., difference in friction of moving parts, stiffness of components, etc.) or characteristic deterioration with age (due to, e.g., electrode wear, etc.) in the welding gun 16.

Further, in the spot welding system 10, the appropriate-value computing section 28 of the set-value adjusting section 24 of the gun motion controller 20 determines the appropriate value Vac of the speed set-value Vc based on the pre-convergence transient data Ftd in the force data Fd, so that, even when the force data Fd representing, in a time-series manner, the actual pressurizing force F includes the transient data Ftd having anyone of an overshoot response pattern and an undershoot response pattern relative to the force target-value Fc, the appropriate value Vac can be determined for the purpose of allowing the response pattern of the transient data Ftd to fall within a predetermined tolerable range. Therefore, in contrast to the technique described in, for examples JP-A-6-312273, in which the inter-electrode pressurizing force is controlled in such a manner as to always exhibit an undershoot response pattern and the protruding amount of the movable electrode is corrected based on a judgment of the convergence in a steady state of the actual pressurizing force, it is possible to quickly perform the automatic adjustment of the closing speed of the electrode pair 14 to the appropriate value Vac, and thus to improve a welding quality and reduce a welding cycle time. Thus, according to the spot welding system 10, it is possible to automatically and readily adjust the closing speed of the electrode pair 14 to the appropriate value Vac, while accommodating the individual structural difference or characteristic deterioration with age of the welding gun 16, and thereby to ensure the improvement of a welding quality and the reduction of a welding cycle time and also to achieve the simplification and acceleration of a system starting-up work.

Figure 2:
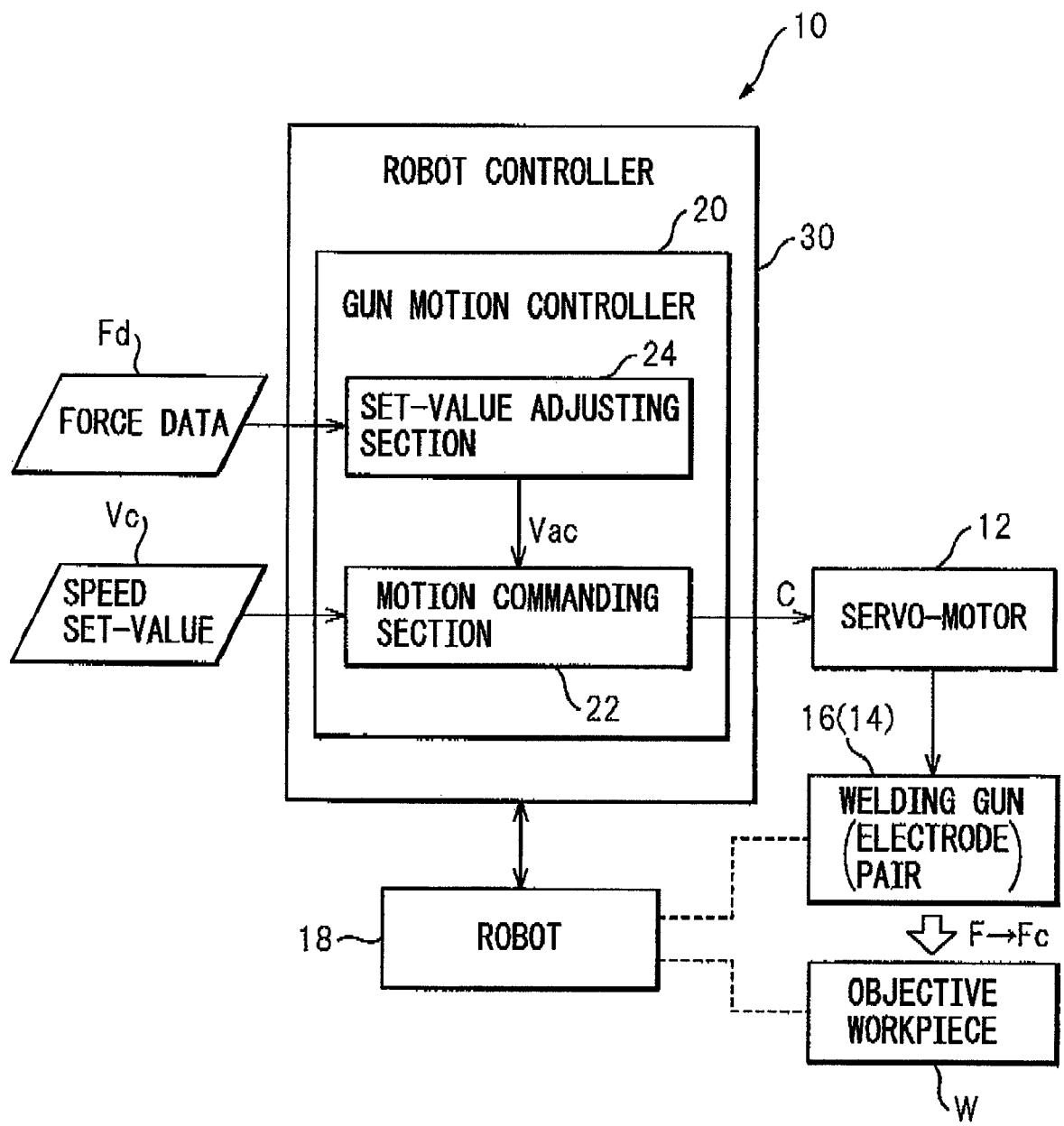
FIG. 2 is a functional block diagram showing a preferred modification of the spot welding system of FIG. 1.

As shown in FIG. 2, the spot welding system 10 may further include a robot controller 30 for controlling the robot 18. The gun motion controller 20 may be comprised of a part of functions of the robot controller 30. In this configuration, the single robot controller 30 can control the operations of the robot 18 and the welding gun 16 in an integrated manner, and therefore, the system configuration can be simplified.

Figure 3:
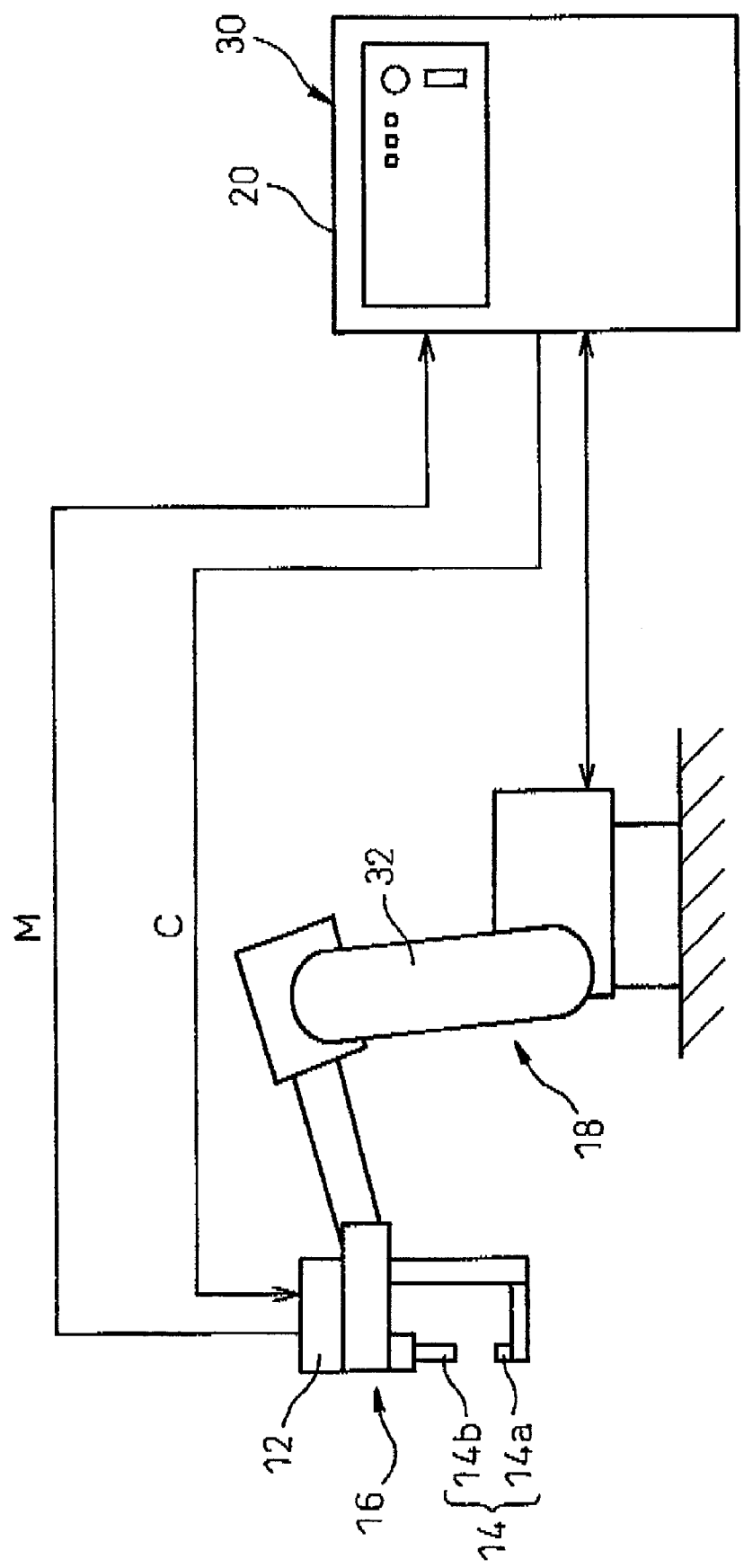
FIG. 3 is an illustration schematically showing an example of an overall configuration of the spot welding system of FIG. 1.
Figure 4:
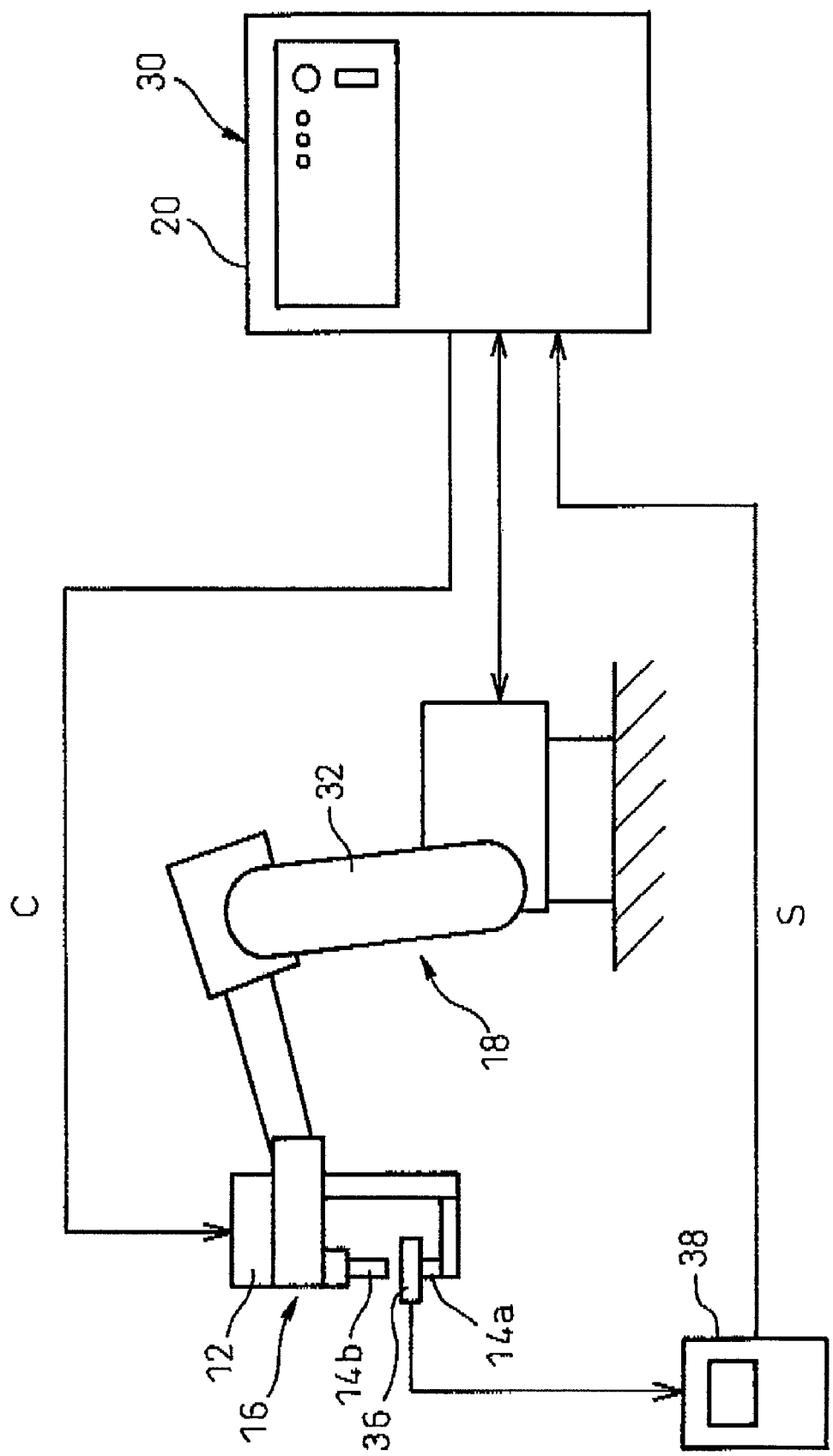
FIG. 4 is an illustration schematically showing another example of an overall configuration of the spot welding system of FIG. 1.
Figure 5:
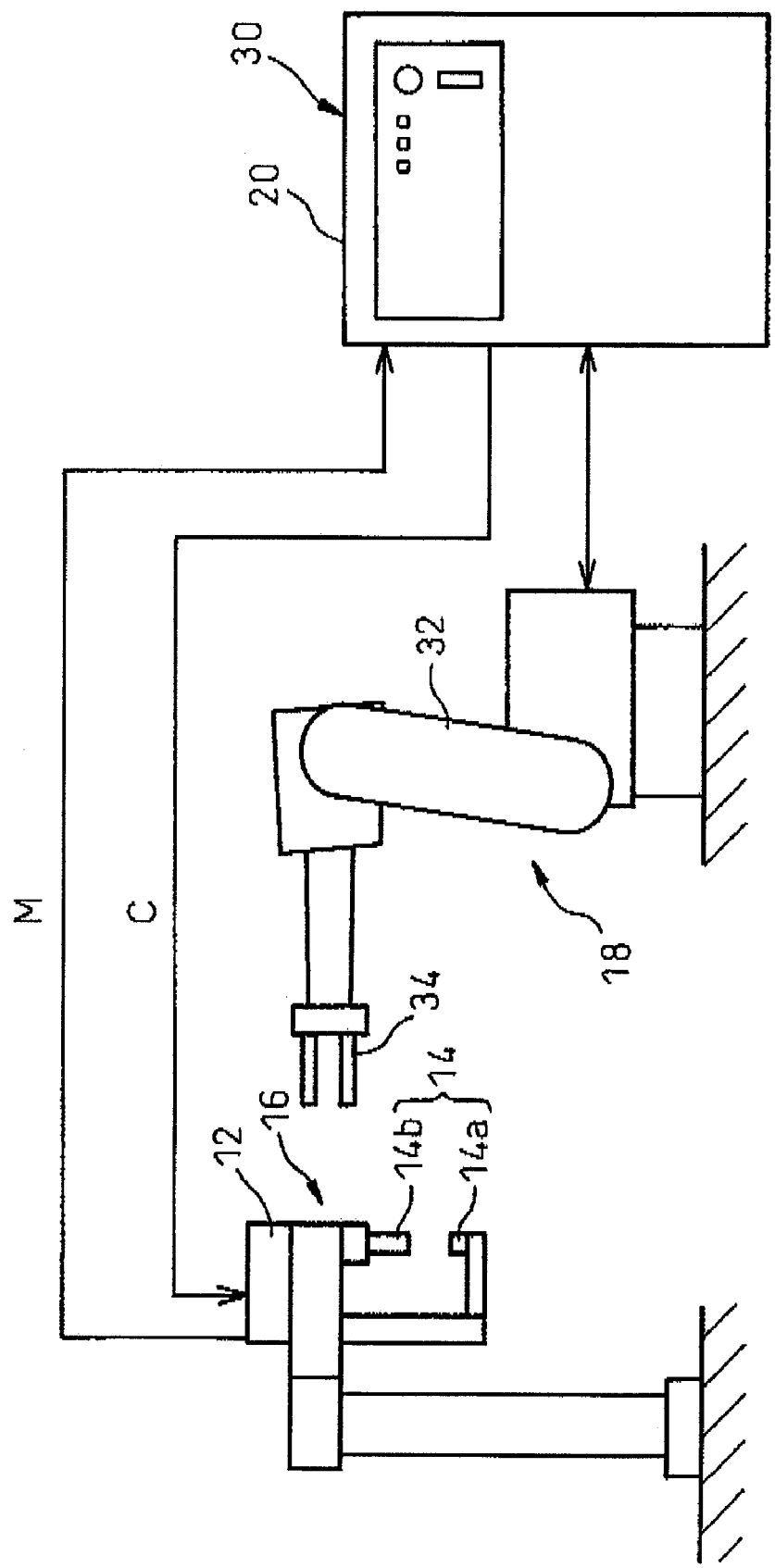
FIG. 5 is an illustration schematically showing yet another example of an overall configuration of the spot welding system of FIG. 1.

As shown in FIGS. 3 and 4, the spot welding system 10 according to the present invention may be configured so that the welding gun 16 as a working tool (i.e., an end effector) is attached to the distal end of an arm structure (i.e., a manipulator) 32 of the robot 18 having an articulated or other configuration, and that the robot operates variously, so as to sequentially locate the electrode pair 14 of the welding gun 16 with respect to a plurality of junction points on the objective workpieces (not shown) showing various positions and orientations. Alternatively, as shown in FIG. 5, the spot welding system 10 may be configured so that the robot 18 grips the objective workpieces (not shown) by a hand 34 attached to the distal end of the arm structure 32 and operates variously with respect to the welding gun 16 disposed in a stationary state at a predetermined position in a working space of the robot 18, so as to sequentially locate a plurality of junction points at a predetermined welding position.

The welding gun 16 has, as the electrode pair 14, an electrode 14a at a stationary side (a lower side, in the drawing) and an electrode 14b at a movable side (an upper side, in the drawing) operating to open or close relative to the electrode 14a. The servo-motor 12 actuates the movable electrode 14b to open or close relative to the stationary electrode 14a at a suitable speed in accordance with a motion command C from the gun motion controller 20 (or one function of the robot controller 30). The welding gun 16 holds several objective workpieces stacked on each other (not shown) between the electrodes 14a, 14b and applies a predetermined current for a predetermined time to the held point on the objective workpieces while applying a predetermined pressurizing force thereto, and thereby ensures a weld having a desired quality. The welding gun 16 is not limited to the above, and may have several electrode pairs 14.

The spot welding system 10 may include (FIG. 4) or not include (FIGS. 3 and 5) a pressure sensor 36 that senses the actual pressurizing force generated in the electrode pair 14 when the servo-motor 12 actuates the electrode pair 14 of the welding gun 16 to close in accordance with the motion command C of the motion commanding section 22 (FIG. 1). In the case where the pressure sensor is not included (FIGS. 3 and 5), in the gun motion controller 30 (or one function of the robot controller 30), the force-data obtaining section 26 of the set-value adjusting section 24 (FIG. 1) obtains the force data Fd (FIG. 1) of the pressurizing force actually generated in the electrode pair 14 of the welding gun 16, based on feedback information M from the servo-motor 12 (an obtaining process will be described later).

On the other hand, in the case where the pressure sensor 36 is included (FIG. 4), in the gun motion controller 30 (or one function of the robot controller 30), the force-data obtaining section 26 of the set-value adjusting section 24 (FIG. 1) directly obtains the force data Fd (FIG. 1) based on information (i.e., a pressure detection signal S) from the pressure sensor 36. In the configuration where the pressure sensor 36 is included, the pressure sensor 36 is disposed in the electrode pair 14 of the welding gun 16 only during the closing-speed automatic adjusting process by the gun motion controller 20. Further, a signal processor 38 is disposed between the pressure sensor 36 and the gun motion controller 20, wherein the signal processor 38 includes an amplifier that amplifies the pressure detection signal S from the pressure sensor 36 and a monitor that displays the pressure detection signal S amplified by the amplifier on screen, converts the pressure detection signal S into an analog signal and sends it to the gun motion controller 20.

Figure 6:
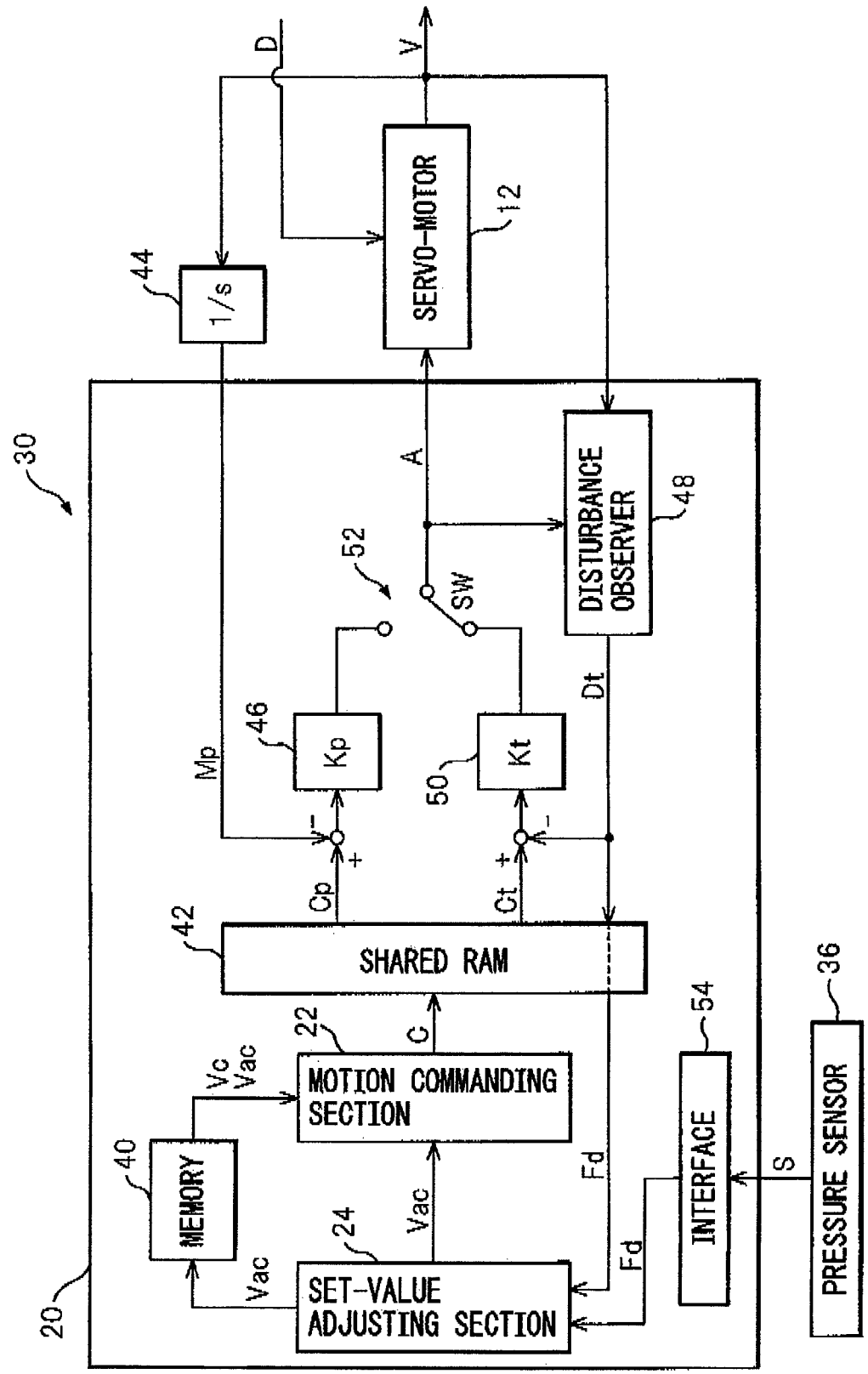
FIG. 6 is a block diagram showing an example of a control configuration of a gun motion controller in the spot welding system of FIG. 1.

FIG. 6 shows, by a block diagram, an example of a configuration of the gun motion controller 20 (or one function of the robot controller 30). In the illustrated example, the speed set-value Vc as a standard value (or an initial value), designated, depending on an experimental rule, by a manufacturer of the welding gun 16 or the operator of the spot welding system 10, is input to the gun motion controller 20 through an input means (not shown) and stored in a memory 40 in advance. The motion commanding section 22 generates the motion command C for controlling the servo-motor 12 in accordance with the speed set-value Vc stored in the memory 40, and transfers the motion command C to a shared RAM 42.

The gun motion controller 20 performs a position control of the servo-motor 12, based on a position command Cp included in the motion command C stored in the -shared RAM 42, position information Mp as a primary feedback amount obtained by converting an actual speed value V of the servo-motor 12 by an integrator (i.e., 1/s; where "s" is a Laplacean operator) 44, and a position control gain Kp of an amplifier-regulator 46. The actual speed value V of the servo-motor 12 may be obtained from a speed and position detector such as a pulse coder, etc. (not shown) provided for the servo-motor 12.

Further, the gun motion controller 20 includes a disturbance observer 48 that estimates a disturbance torque Dt applied to the servo-motor 12, based on a control current value A given to the servo-motor 12 and an actual speed measurement value V obtained from the servo-motor 12 when the servo-motor 12 actuates the electrode pair 14 of the welding gun 16 to close in accordance with the motion command C of the motion commanding section 22. The gun motion controller 20 thus performs a torque control of the servo-motor 12, based on a torque command Ct included in the motion command C stored in the shared RAM 42, the disturbance torque Dt estimated by the disturbance observer 48, and a torque control gain Kt of an amplifier-regulator 50. The disturbance torque Dt estimated by the disturbance observer 48 is then transferred to the shared RAM 42.

The gun motion controller 20 further includes an internal switch (SW) 52 for switching between the position control and the torque control. The gun motion controller 20 performs the position control of the servo-motor 12 during a period before the movable electrode 14b of the electrode pair 14 of the welding gun 16 (FIG. 3) reaches a reference pressurizing position (i.e., a suitable position after the beginning of contact) at which a predetermined pressurizing force (or a threshold) is applied to the objective workpieces. At an instant when the movable electrode 14b (FIG. 3) reaches the reference pressurizing position, the motion commanding section 22 sends a control switching command to the internal switch 52, and thereby the internal switch 52 is actuated to switch the position control to the torque control. After that, the torque control of the servo-motor 12 is performed until the pressurizing force F generated in the electrode pair 14 fully converges to the force target-value Fc (FIG. 1).

In the configuration described above, the disturbance D applied to the servo-motor 12 mainly includes the pressurizing force F generated in the electrode pair 14 of the welding gun 16. Therefore, a waveform (i.e., time-series data) of the disturbance torque Dt estimated by the disturbance observer 48 is similar to a response waveform (i.e., time-series data) of the pressurizing force F in the electrode pair 14. Thus, the set-value adjusting section 24 can obtain, as the force data Fd, the time-series data of the disturbance torque Dt estimated by the disturbance observer 48 from the shared RAM 42 (by the force-data obtaining section 26 (FIG. 1)) and, based on the pre-convergence transient data Ftd (FIG. 1) in the force data Fd thus obtained, determine the appropriate value Vac of the speed set-value Vc (by the appropriate-value computing section 28 (FIG. 1)).

Alternatively, in the case where the spot welding system 10 includes the pressure sensor 36 (FIG. 4), the time-series data of the actual pressurizing force sensed by the pressure sensor 36 (i.e., the pressure detection signal S) is input to the gun motion controller 20 via an interface 54 and, after being subjected to an appropriate signal processing, is obtained by the set-value adjusting section 24 (or the force-data obtaining section 26 (FIG. 1)) as the force data Fd. The appropriate value vac determined by the set-value adjusting section 24 (or the appropriate-value computing section 28 (FIG. 1)) is stored in the memory 40 and used for an actual spot welding process. Further, as described later, in the case where it is required to further adjust the appropriate value Vac, the appropriate value Vac is transferred to the motion commanding section 22 either directly or via the memory 40.

A configuration of the gun motion controller 20 and a closing-speed automatic adjusting process for the welding gun 16 (FIG. 1) performed by the gun motion controller 20, in the spot welding system according to a first embodiment of the present invention, will be described with reference to FIGS. 7 to 9B. The gun motion controller 20 according to the illustrated embodiment has a basic configuration identical to that of the gun motion controller 20 shown in FIG. 1, and therefore, corresponding components are designated by like reference numerals and the descriptions thereof are not repeated.

Figure 7:
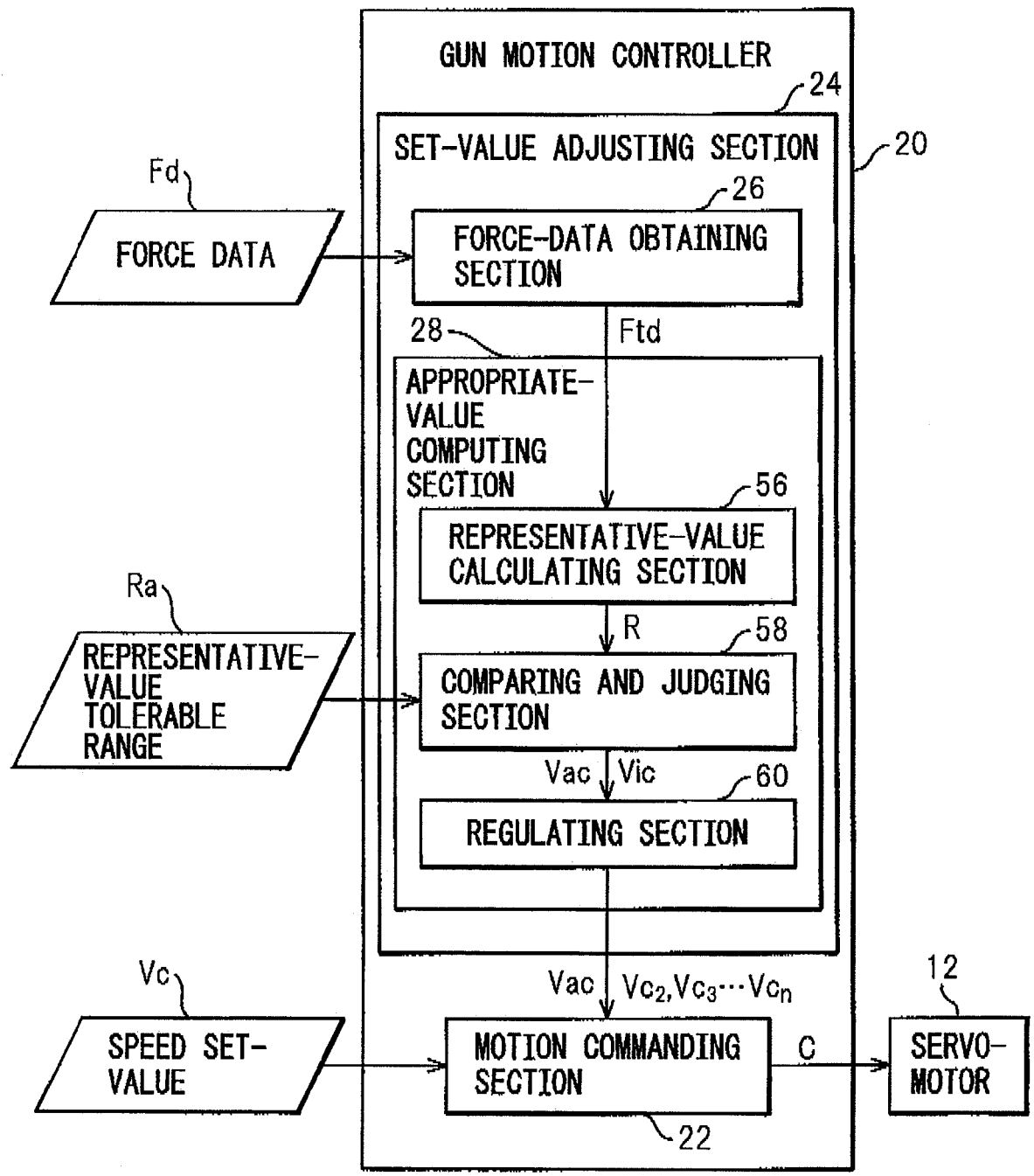
FIG. 7 is a functional block diagram showing a configuration of a gun motion controller in a spot welding system according to a first embodiment of the present invention.

As shown in FIG. 7, the gun motion controller 20 includes the motion commanding section 22 and the set-value adjusting section 24, and the set-value adjusting section 24 includes the force-data obtaining section 26 and the appropriate-value computing section 28. In the illustrated embodiment, the appropriate-value computing section 28 includes a representative-value calculating section 56 that calculates, from the transient data Ftd in the force data Fd obtained by the force-data obtaining section 26, a representative value R typically representing a response pattern of the transient data Ftd; a comparing and judging section 58 that compares the representative value R calculated by the representative-value calculating section 56 with a representative-value tolerable range Ra previously prepared with reference to S the force target-value Fc (FIG. 1) and judges that, when the representative value R is included within the representative-value tolerable range Ra, the speed set-value Vc is the appropriate value Vac and, when the representative value R is not included within the representative-value tolerable range Ra, the speed set-value Vc is an inappropriate value via; and an regulating section 60 that acts, based on the judgment of the comparing and judging section 58, to terminate, when the speed set-value Vc is judged as the appropriate value Vac, an automatic adjusting process for the speed set-value Vc, and to determine, when the speed set-value Vc is judged as the inappropriate value Vic, a second speed set-value $Vc_2$ different from the speed set-value Vc judged as the inappropriate value and give the second speed set-value $Vc_2$ to the motion commanding section 22.

In the gun motion controller 20 configured as described above, in order to judge whether the speed set-value Vc given to the motion commanding section 22 is the appropriate value Vac or the inappropriate value Vic, the appropriate-value computing section 28 checks whether the representative value R (e.g., a maximum value of an overshoot) in the transient data Ftd of the force data Fd is included within the previously prepared representative-value tolerable range Ra (e.g., a tolerable range of an overshoot). In this connection, the representative-value tolerable range Ra is previously designated, depending on an experimental rule, by the manufacturer of the welding gun 16 or the operator of the spot welding system 10, and is input to the gun motion controller 20 by an input means (not shown) and stored in, for example, the memory 40 (FIG. 6). Thus, in the gun motion controller 20 according to the first embodiment, it is evaluated whether the response waveform of the transient data Ftd of the force data Fd generated based on the speed set-value Vc is empirically allowable or not, so that the reasonability of the speed set-value Vc can be quickly and accurately judged and thus the appropriate value Vac can be specified.

In the configuration described above, when the speed set-value Vc is the appropriate value Vac, the appropriate-value computing section 28 can store the speed set-value Vc in the memory 40 (FIG. 6) as the appropriate value Vac. In an actual spot welding process, the motion commanding section 22 can output the motion command C in accordance with the speed set-value Vc (or the appropriate value Vac) read out from the memory 40. On the other hand, when the speed set-value Vc is the inappropriate value Vic, the motion commanding section 22 and the set-value adjusting section 24 can perform the automatic adjusting process for the second speed set-value $Vc_2$ determined by the regulating section 60.

In this automatic adjusting process, the motion commanding section 22 outputs the motion command C to the servomotor 12 in accordance with the second speed set-value $Vc_2$, and the set-value adjusting section 24 evaluates whether the representative value R in the transient data Ftd of the force data Fd, when the servo-motor 12 actuates the electrode pair 14 to close in accordance with the motion command C, is included within the representative-value tolerable range Ra or not, and thereby judges whether the second speed set-value $Vc_2$ is the appropriate value Vac or the inappropriate value Vic. In the case where the second speed set-value $Vc_2$ is judged as the appropriate value Vac, the automatic adjusting process for the second speed set-value $Vc_2$ is terminated. On the other hand, in the case where the second speed set-value $Vc_2$ is judged as the inappropriate value Vic, a third speed set-value $Vc_3$ different from the second speed set-value $Vc_2$ is determined, and the third speed set-value $Vc_3$ is given to the motion commanding section 22. In this manner, accuracy of the closing-speed automatic adjustment of the welding gun 16 (FIG. 1) can be improved.

Further, the motion commanding section 22 and the set-value adjusting section 24 can repeatedly perform the above-described automatic adjusting process for a plurality of mutually different speed set-values $Vc_n$ successively determined by the regulating section 60, until the comparing and judging section 58 judges that any one of the speed set-values $Vc_n$ is the appropriate value Vac. In this manner, the accuracy of the closing-speed automatic adjustment of the welding gun 16 (FIG. 1) can be further improved. In this case, it is advantageous in terms of safety, if the number of repetition of the automatic adjusting process exceeds a predetermined limit number, to judge that an error occurs and to forcibly terminate the automatic adjusting process.

The closing-speed automatic adjusting process performed by the gun motion controller 20 according to the first embodiment, and an example of a process for judging the reasonability of the speed set-values Vc $Vc_n$ by the set-value adjusting section 24, will be described in more specifically.

Figure 8:
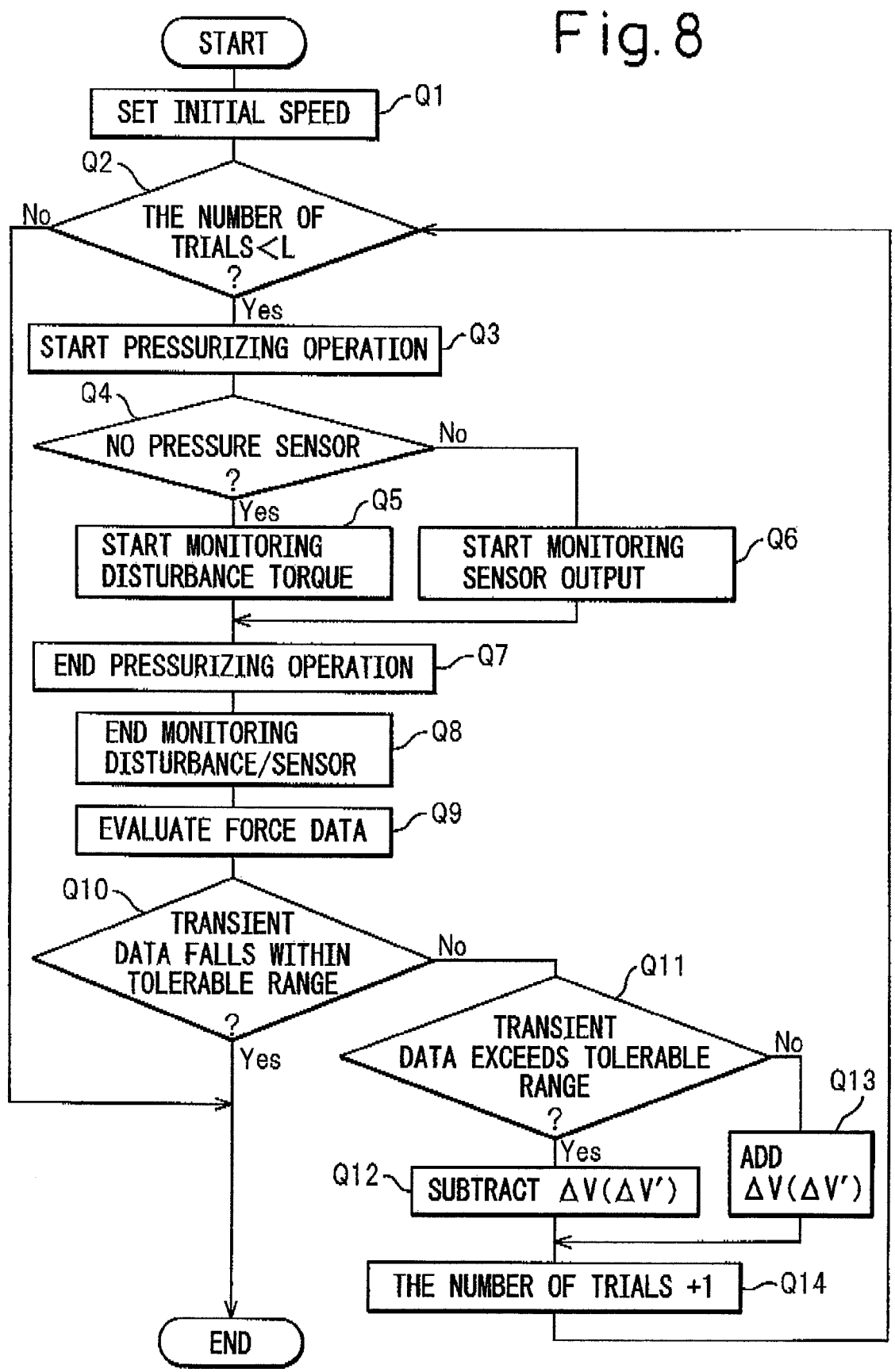
FIG. 8 is a flow chart showing a closing-speed automatic adjusting process for a welding gun executed by the gun motion controller of FIG. 7.

As shown in a flow chart of FIG. 8, in the closing-speed automatic adjusting process according to the first embodiment, an operator first designates the speed set-value Vc (FIG. 7) as a standard value (or an initial value) (step Q1). Thereafter, the gun motion controller 20 counts the number of trials of a pressurizing operation of the welding gun 16 (FIG. 1) (i.e., a closing motion of the electrode pair 14 (FIG. 1)) performed for the closing-speed automatic adjustment, and judges whether the number of trials reaches a predetermined limit number L or not (step Q2). Step Q2 executed immediately after step Q1 shows the first trial, and thus the motion commanding section 22 (FIG. 7) outputs the motion command C (FIG. 7) to the servo-motor 12, in accordance with the initial speed set-value Vc, so as to start the pressurizing operation for the closing-speed automatic adjustment (step Q3).

Next, the gun motion controller 20 judges whether the pressure sensor 36 (FIG. 4) is provided for the welding gun 16 or not, based on, for example, preliminary setting information input by the operator (step Q4) and, if the pressure sensor 36 is not provided, the force-data obtaining section 26 (FIG. 7) starts to monitor the disturbance torque Dt (FIG. 6) estimated by the disturbance observer 48 (FIG. 6), and obtains the time-series data of the disturbance torque Dt as the force data Fd (FIG. 7) (step Q5). On the other hand, if the pressure sensor 36 is provided, the force-data obtaining section 26 starts to monitor the output (or the pressure detection signal S) from the pressure sensor 36, and obtains the time-series data of the pressure detection signal S as the force data Fd (step Q6).

Once the force-data obtaining section 26 obtains the force data Fd that reaches a steady state with a transient response component being sufficiently damped, the motion commanding section 22 gives a command to the servo-motor 12 so as to terminate the pressurizing operation (step Q7), and the force-data obtaining section 26 terminates monitoring the disturbance torque Dt or the pressure detection signal S (step Q8). Then, the appropriate-value computing section 28 (FIG. 7) evaluates, for the force data Fd obtained by the force-data obtaining section 26, whether the response waveform of the transient data Ftd thereof (FIG. 7) is empirically allowable or not (step Q9).

Figure 9A:
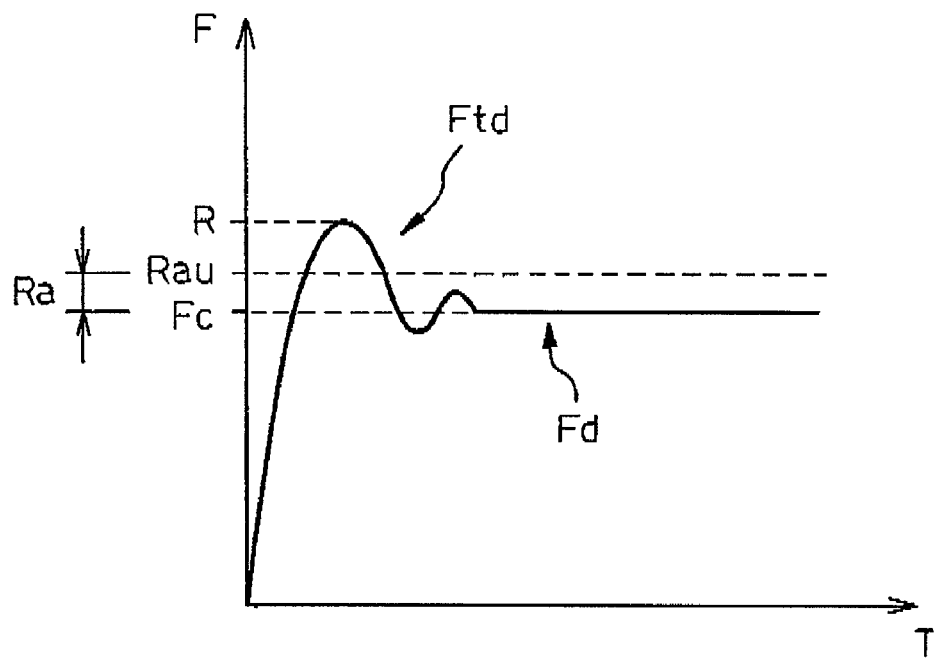
FIG. 9A is an illustration explaining an example of a technique for judging a reasonability of a speed set-value in the closing-speed automatic adjusting process of FIG. 8, and showing force data exhibiting an overshoot response pattern.
Figure 9B:
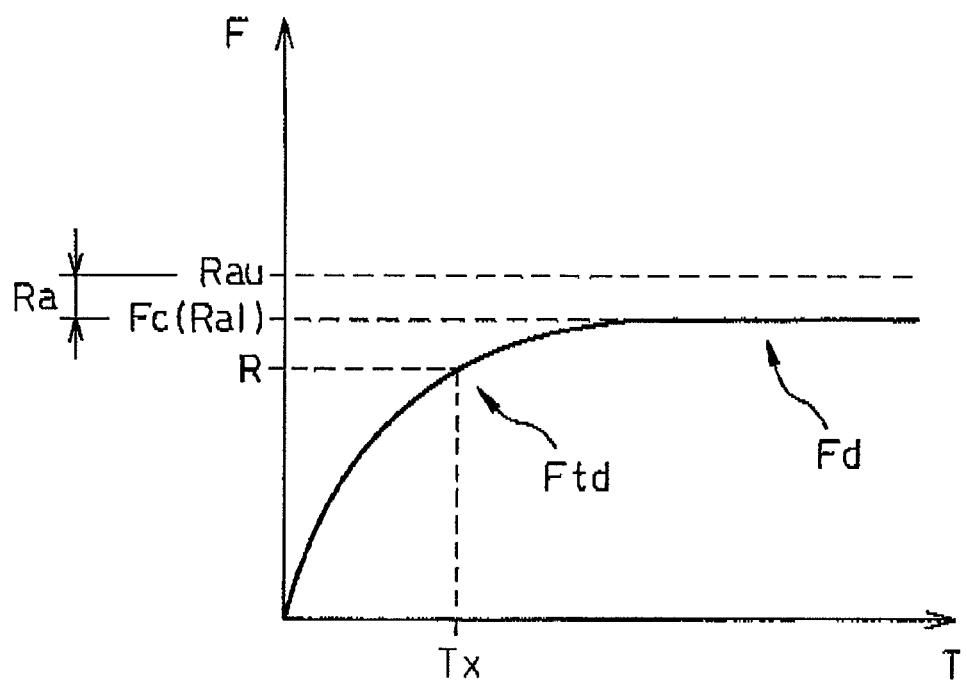
FIG. 9B is an illustration explaining an example of a technique for judging a reasonability of a speed set-value in the closing-speed automatic adjusting process of FIG. 8, and showing force data exhibiting an undershoot response pattern.

More specifically, as shown in FIGS. 9A and 9B, in the case where the transient data Ftd in the force data Fd includes an overshoot relative to the force target-value Fc (FIG. 9A), the representative-value calculating section 56 (FIG. 7) calculates the maximum value of the transient data Ftd as the representative value R. On the other hand, in the case where the transient data Ftd in the force data Fd entirely exhibits an undershoot relative to the force target-value Fc (FIG. 9B), the representative-value calculating section 56 calculates a value of the transient data Ftd, defined at a predetermined time Tx, as the representative value R. The predetermined time Tx may be defined as, for example, a time when the internal switch 52 (FIG. 6) switches the position control to the torque control in response to the command from the motion commanding section 22 (FIG. 7) as described above. The representative value R may be calculated either as an absolute value of the force data Fd or a relative value with reference to the force target-value Fc.

Once the representative value R (i.e., the maximum value or the value at the time T, of the transient data Ftd) is calculated, the comparing and judging section 58 (FIG. 7) checks whether the representative value R is included within the previously prepared representative-value tolerable range Ra or not and, when the representative value R is included within the representative-value tolerable range Ra, judges that the speed set-value Vc is the appropriate value Vac (step Q10). Based on this judgment, the regulating section 60 (FIG. 7) terminates the closing-speed automatic adjusting process.

On the other hand, when the representative value R (i.e., the maximum value or the value at the time T, of the transient data Ftd) is not included within the representative-value tolerable range Ra (i.e., the state shown in FIG. 9A or 9B), the comparing and judging section 58 judges that the speed set-value Vc is the inappropriate value Vic (step Q10). Then, the regulating section 60 judges whether the representative value R exceeds the representative-value tolerable range Ra or not (step Q11). If the representative value R exceeds the representative-value tolerable range Ra (i.e., if the transient data Ftd shows an excessive overshoot (see FIG. 9A)), the speed set-value Vc can be considered too large, and therefore, the regulating section 60 operates to subtract a previously-prepared default regulation variable $\Delta V$ from the speed set-value Vc, so as to determine the second speed set-value $Vc_2$ (step Q12). On the other hand, if the representative value R is smaller than the representative-value tolerable range Ra (i.e., if the transient data Ftd shows an undershoot (see FIG. 9B)), the speed set-value Vc can be considered too small, and therefore, the regulating section 60 operates to add a previously-prepared default regulation variable $\Delta V$ to the speed set-value Vc, so as to determine the second speed set-value $Vc_2$ (step Q13).

Alternatively, when the representative value R is judged to exceed the representative-value tolerable range Ra in step Q11, the regulating section 60 may determine, in step Q12, a calculated regulation variable $\Delta V'$ based on a difference between the representative value R and, for example, an upper limit value Rau of the representative-value tolerable range Ra, and operate to subtract the calculated regulation variable $\Delta V'$ from the speed set-value Vc, so as to determine the second speed set-value $Vc_2$. In this case, $\Delta V'=G(R-Rau)$ may be established (where G is a proportionality constant). On the other hand, when the representative value R is judged to be smaller than the representative-value tolerable range Ra in step Q11, the regulating section 60 may determine, in step Q13, a calculated regulation variable $\Delta V'$ based on a difference between the representative value R and, for example, a lower limit value Ral of the representative-value tolerable range Ra (identical to the force target-value Fc, in the illustrated example), and operate to add the calculated regulation variable $\Delta V'$ to the speed set-value Vc, so as to determine the second speed set-value $Vc_2$. In this case, $\Delta V'=G(Ral-R)$ may be established (where G is a proportionality constant). In this connection, the calculated regulation variable $\Delta V'$ is a variable for regulating the speed set-value Vc in such a manner that the representative value R falls within the representative-value tolerable range Ra, and therefore, in the configuration described above, the regulating section 60 may also determine the calculated regulation variable $\Delta V'$ based on a difference between the representative value R and a predetermined arbitrary value Rao (e.g., an intermediate value) in the representative-value tolerable range Ra (except for the upper limit value Rau and the lower limit value Ral).

The default regulation variable $\Delta V$ mentioned above is previously designated, depending on an experimental rule, by an operator of the spot welding system 10, and thus is input to the gun motion controller 20 through input means (not shown) and, for example, stored in the memory 40 (FIG. 6). The smaller default regulation variable $\Delta V$ improves the accuracy of the closing-speed automatic adjustment. Similarly, the proportionality constant G for determining the calculated regulation variable $\Delta V$ is previously designated, depending on an experimental rule, by an operator of the spot welding system 10, and thus is input to the gun motion controller 20 through input means (not shown) and, for example, stored in the memory 40 (FIG. 6). The smaller proportionality constant G improves the accuracy of the closing-speed automatic adjustment. Similarly, the value Rao for determining the calculated regulation variable $\Delta V'$ may be previously designated, depending on an experimental rule, by an operator of the spot welding system 10, and thus is input to and stored in the gun motion controller 20.

Once the second speed set-value $Vc_2$ is determined in a manner as described above, the gun motion controller 20 increments the number of trials of the pressurizing operation of the welding gun 16 (FIG. 1) performed for the closing-speed automatic adjustment by "one" (step Q14), and returns to step Q2 so as to perform the automatic adjusting process (steps Q2 to Q14) for the second speed set-value $Vc_2$. The automatic adjusting process is performed repeatedly for a plurality of different speed set-values Vcn, until it is judged, in step Q10, that the representative value R of the transient data Ftd is included within the representative-value tolerable range Ra (i.e., the speed set-values Vcn is the appropriate value Vac). In this connection, when it is judged, in step Q2, that the number of trials of the pressurizing operation exceeds the limit number L, the automatic adjusting process is forcibly terminated.

As described above, in the closing-speed automatic adjusting process according to the first embodiment, the adjusting process for a single welding gun 16 is repeated as occasion demands in such a manner that the response pattern (particularly, in the overshoot region) of the transient data Ftd of the force data Fd representing, in a time-series manner, the actual pressurizing force F in the electrode pair 14 fall within the predetermined tolerable range, based on various conditions (initial speed set-value Vc, representative-value tolerable range Ra, default regulation variable $\Delta V$ (or the proportionality constant G)) previously determined, depending on an experimental rule, by the manufacturer of the welding gun 16 or the operator of the spot welding system 10, and thereby it is possible to automatically adjust the closing speed of the electrode pair 14 to the appropriate value Vac, without being affected by the individual structural difference or characteristic deterioration with age of the welding gun 16. Although, in the example of FIGS. 9A and 9B, the lower limit value Ral of the representative-value tolerable range Ra is set to be identical to the force target-value Fc, the lower limit value Ral may be set to a value somewhat lower than the force target-value Fc. In this case, the speed set-value Vc that allows the transient data Ftd of the force data Fd to exhibit a slight undershoot may also be accepted as the appropriate value Vac.

Now, a configuration of the gun motion controller 20 and a closing-speed automatic adjusting process for the welding gun 16 (FIG. 1) performed by the gun motion controller 20, in the spot welding system according to a second embodiment of the present invention, will be described with reference to FIGS. 10 to 14B. The gun motion controller 20 according to the illustrated embodiment has a basic configuration identical to that of the gun motion controller 20 shown in FIG. 1, and therefore, corresponding components are designated by like reference numerals and the descriptions thereof are not repeated.

Figure 10:
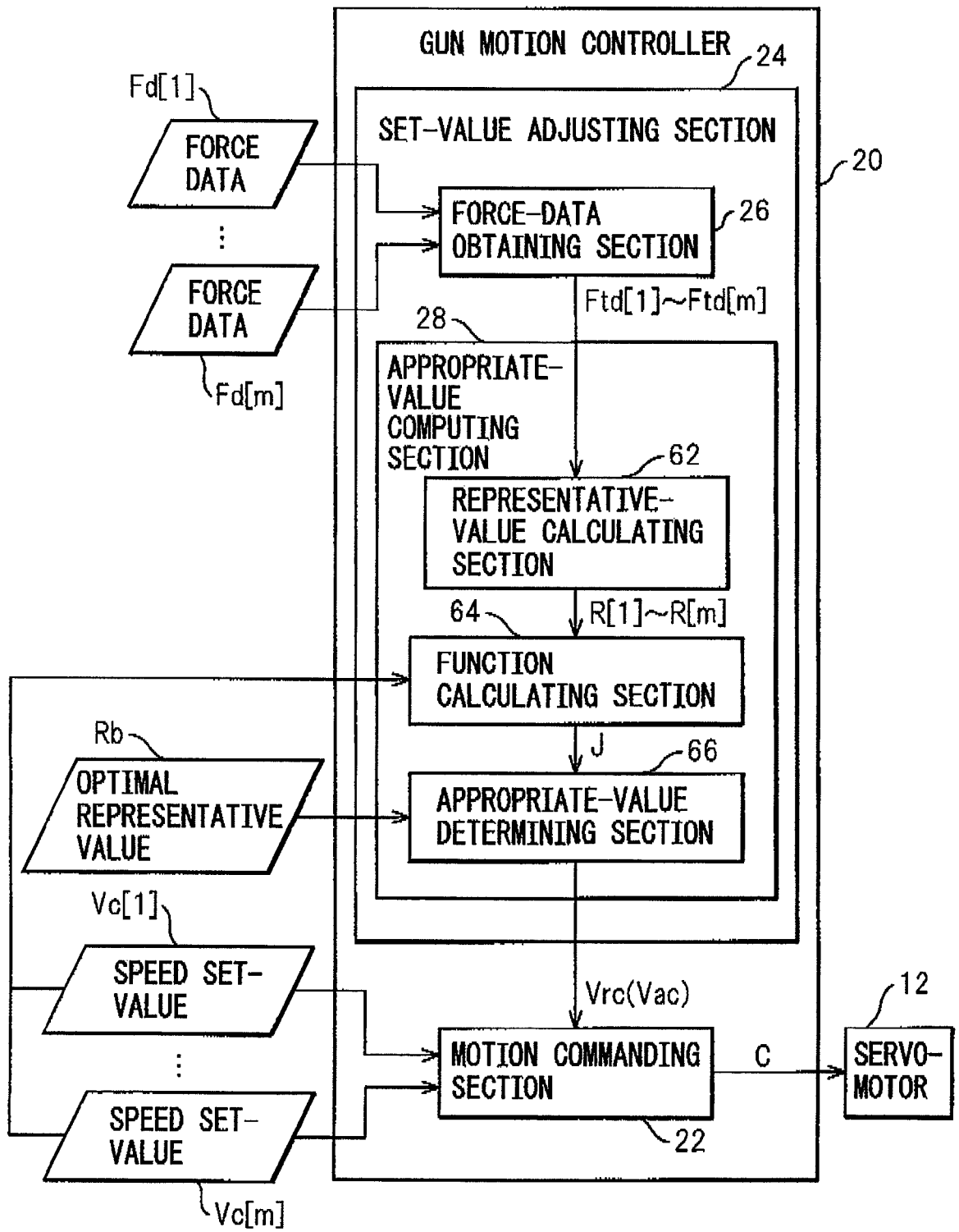
FIG. 10 is a functional block diagram showing a configuration of a gun motion controller in a spot welding system according to a second embodiment of the present invention.

As shown in FIG. 10, the gun motion controller 20 includes the motion commanding section 22 and the set-value adjusting section 24, and the set-value adjusting section 24 includes the force-data obtaining section 26 and the appropriate-value computing section 28. In the illustrated embodiment, the force-data obtaining section 26 obtains mutually different several sets ("m" sets) of force data Fd[1] to Fd[m] that respectively represent, in a time-series manner, the pressurizing force F (FIG. 1) generated in the electrode pair 14 (FIG. 1) when the motion commanding section 22 puts the servomotor 12 into operation to actuate the electrode pair 14 to close in accordance with mutually different several ("m") speed set-values Vc[1] to Vc[m] that are previously prepared in connection with a single force target-value Fc (FIG. 1). The appropriate-value computing section 28 includes a representative-value calculating section 62 that calculates, from several sets of transient data Ftd[1] to Ftd[m] respectively in the several sets of force data Fd[1] to Fd[m] obtained by the force-data obtaining section 26, several ("m") representative values R[1] to R[m] that respectively and typically represent response patterns of the several sets of transient data Ftd[1] to Ftd[m]; a function calculating section 64 that calculates a force/speed curve J that approximately represents a correlativity between the several representative values R[1] to R[m] calculated by the representative-value calculating section 62 and the several speed set-values Vc[1] to Vc[m] respectively corresponding to the several representative values R[1] to R[m]; and an appropriate-value determining section 66 that determines an applicable speed set-value Vrc as the appropriate value Vac, by using the force/speed curve J calculated by the function calculating section 64, the applicable speed set-value Vrc corresponding to an optimal representative value Rb that is previously prepared with reference to the force target-value Fc, and gives the applicable speed set value Vrc (i.e., the appropriate value Vac) to the motion commanding section 22.

In the gun motion controller 20 configured as described above, the motion commanding section 22 tries the pressurizing operation of the welding gun 16 (FIG. 1) performed for the closing-speed automatic adjustment (i.e., the closing motion of the electrode pair (FIG. 1)) by the predetermined number ("m") of trials in accordance with the mutually different speed set-values Vc[1] to Vc[m], so that the appropriate-value computing section 28 prepares the force/speed curve J that approximately represents the correlativity between the speed set-values Vc[1] to Vc[m] and the representative values R[1] to R[m] (e.g., maximum values of overshoots) in the transient data Ftd[1] to Ftd[m] of the force data Fd[1] to Fd[m] respectively corresponding to the speed set-values. When referring to the force/speed curve J, the applicable speed set-value Vrc (i.e., the appropriate value Vac), corresponding to the previously-prepared optimal representative value Rb (e.g., the optimal maximum value of an overshoot).

In this connection, the optimal representative value Rb is previously designated, depending on an experimental rule, by the manufacturer of the welding gun 16 or the operator of the spot welding system 10, and is input to the gun motion controller 20 through an input means (not shown) and stored in, for example, the memory 40 (FIG. 6). The number of trials "m" of the pressurizing operation and the respective speed set-values Vc[1] to Vc[m] are previously designated, depending on an experimental rule, by the operator of the spot welding system 10, and the speed set-values Vc[1] to Vc[m] may be input to the gun motion controller 20 through an input means (not shown) and stored in, for example, the memory 40 (FIG. 6). Thus, in the gun motion controller 20 according to the second embodiment, a specific correlation, between the several speed set-values Vc[1] to Vc[m] determined depending on an experimental rule and the response waveforms of the transient data Ftd[1] to Ftd[m] of the several sets of force data Fd[1] to Fd[m] obtained correspondingly, is determined by approximation, so that the applicable speed set-value Vrc as the appropriate value Vac can be quickly and accurately specified, depending on an experimental rule.

In the configuration described above, the appropriate-value computing section 28 can store the applicable speed set-value Vrc, thus determined, in the memory 40 (FIG. 6) as the appropriate value Vac. In an actual spot welding process, the motion commanding section 22 can output the motion command C in accordance with the applicable speed set-value Vrc (or the appropriate value Vac) read out from the memory 40.

The closing-speed automatic adjusting process performed by the gun motion controller 20 according to the second embodiment, and an example of a process for determining the applicable speed set-value Vrc by the set-value adjusting section 24, will be described in more specifically.

Figure 11:
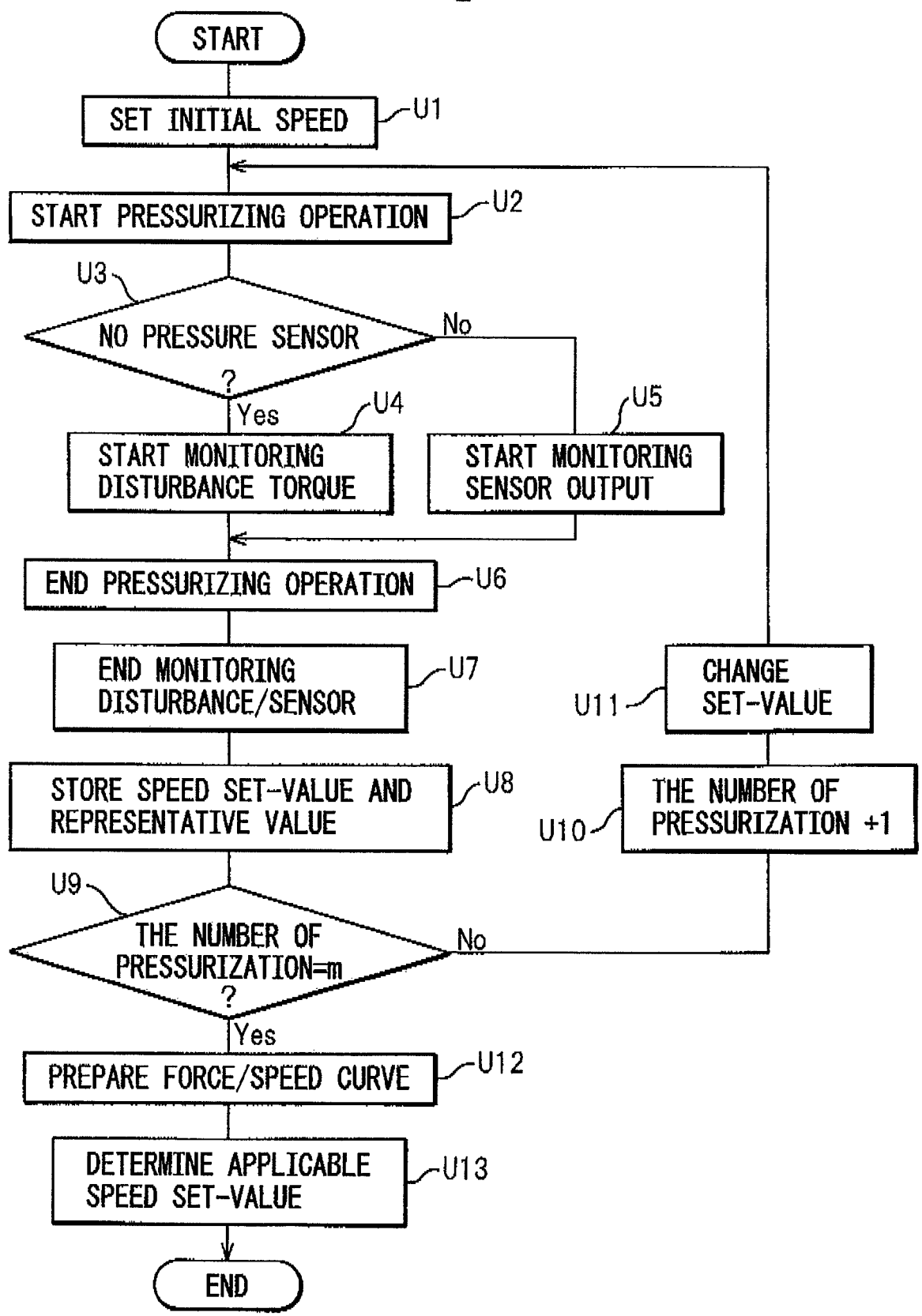
FIG. 11 is a flow chart showing a closing-speed automatic adjusting process for a welding gun executed by the gun motion controller of FIG. 10.

As shown in a flow chart of FIG. 11, in the closing-speed automatic adjusting process according to the second embodiment, an operator first designates the first speed set-value Vc[1] (FIG. 10) (step U1). Thereafter, in accordance with the speed set-value Vc[1], the motion commanding section 22 of the gun motion controller 20 (FIG. 10) outputs the motion command C (FIG. 10) to the servo-motor 12, so as to start the pressurizing operation for the closing-speed automatic adjustment (step U2).

Next, the gun motion controller 20 judges whether the pressure sensor 36 (FIG. 4) is provided for the welding gun 16 or not, based on, for example, preliminary setting information input by the operator (step U3) and, if the pressure sensor 36 is not provided, the force-data obtaining section 26 (FIG. 10) starts to monitor the disturbance torque Dt (FIG. 6) estimated by the disturbance observer 48 (FIG. 6), and obtains the time-series data of the disturbance torque Dt as the force data Fd[1] (FIG. 10) (step U4). On the other hand, if the pressure sensor 36 is provided, the force-data obtaining section 26 starts to monitor the output (or the pressure detection signal S) from the pressure sensor 36, and obtains the time-series data of the pressure detection signal S as the force data Fd[1] (step U5).

Once the force-data obtaining section 26 obtains the force data Fd[1] that reaches a steady state with a transient response component being sufficiently damped, the motion commanding section 22 gives a command to the servo-motor 12 so as to terminate the pressurizing operation (step U6), and the force-data obtaining section 26 terminates monitoring the disturbance torque Dt or the pressure detection signal S (step U7). Then, the appropriate-value computing section 28 (FIG. 10) calculates the representative value R[1] of the transient data Ftd[1] (FIG. 10) in the force data Fd[1] obtained by the force-data obtaining section 26, and stores a set of speed set-value Vc[1] and representative value R[1] in the memory 40 (FIG. 6) (step U8).

The concrete procedure for calculating the representative value R[1] is identical to the calculation procedure of the representative value R in the first embodiment. In summary, as shown in FIG. 12, in the case where the transient data Ftd[n] in the force data Fd[n] (where "n" denotes 1 to "m") includes an overshoot relative to the force target-value Fc, the representative-value calculating section 62 (FIG. 10) calculates the maximum value of the transient data Ftd[n] as the representative value R[n]. On the other hand, in the case where the transient data Ftd[n] in the force data Fd[n] entirely exhibits an undershoot relative to the force target-value Fc, the representative-value calculating section 62 calculates a value of the transient data Ftd[n], defined at a predetermined time Tx (e.g., at a time when the position control is switched to the torque control) as the representative value R[n].

Once the representative value R[1] is thus calculated, the gun motion controller 20 judges whether the number of trials of the pressurizing operation reaches a predetermined number "m" or not (step U9). If the number of trials of the pressurizing operation does not reach the predetermined number "m", the gun motion controller 20 increments the number of trials by "one" (step U10), changes the speed set-value Vc[1] to another predetermined speed set-value Vc[2] (step U11), and returns to step U2. Then, the motion commanding section 22 starts the pressurizing operation for the closing-speed automatic adjustment in accordance with the speed set-value Vc[2], and performs the subsequent steps U3 to U9.

In a manner as described above, the steps U2 to U11 are repeated until the number of trials of the pressurizing operation reaches the predetermined number "m", so that the speed set-values Vc[1] to Vc[m] and the representative values R[1] to R[m] are stored in the memory 40. At this time, as described above, in the case where at least one of the transient data Ftd[1] to Ftd[m] respectively in the several sets of force data Fd[1] to Fd[m] includes an overshoot relative to the force target-value Fc, the maximum value(s) of the transient data Ftd[1] to Ftd[m] including the overshoot is calculated and stored as the representative value(s) R[1] to R[m]. On the other hand, in the case where at least one of the transient data Ftd[1] to Ftd[m] respectively in the several sets of force data. Fd[1] to Fd[m] entirely exhibits an undershoot relative to the force target-value Fc, a value or values, at a predetermined time Tx, of the transient data Ftd[1] to Ftd[m] exhibiting the undershoot is calculated and stored as the representative value(s) R[1] to R[m].

Figure 13A:
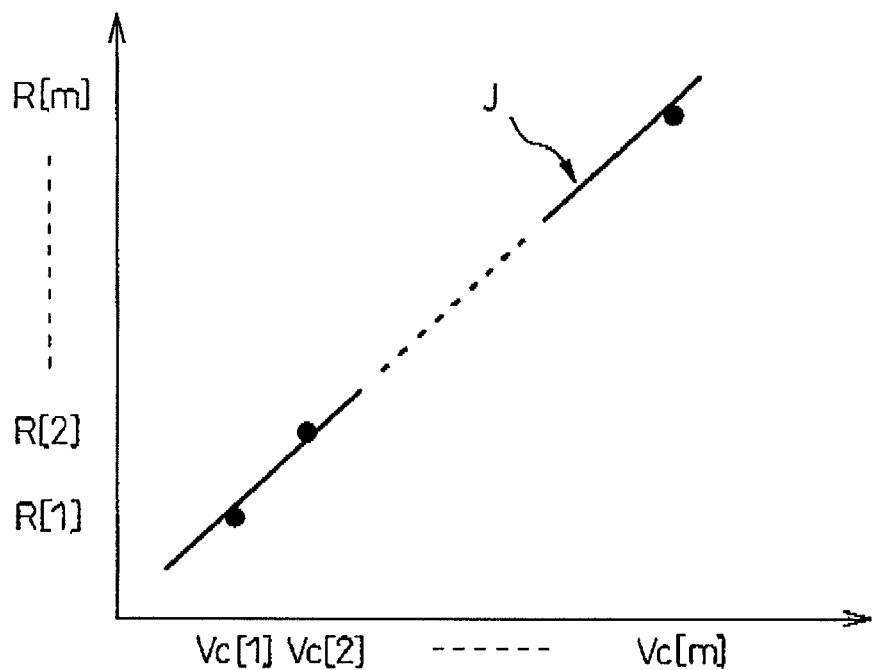
FIG. 13A is an illustration explaining an example of a technique for determining an applicable speed set-value in the closing-speed automatic adjusting process of FIG. 11, and showing a step of preparing a force/speed curve.
Figure 14A:
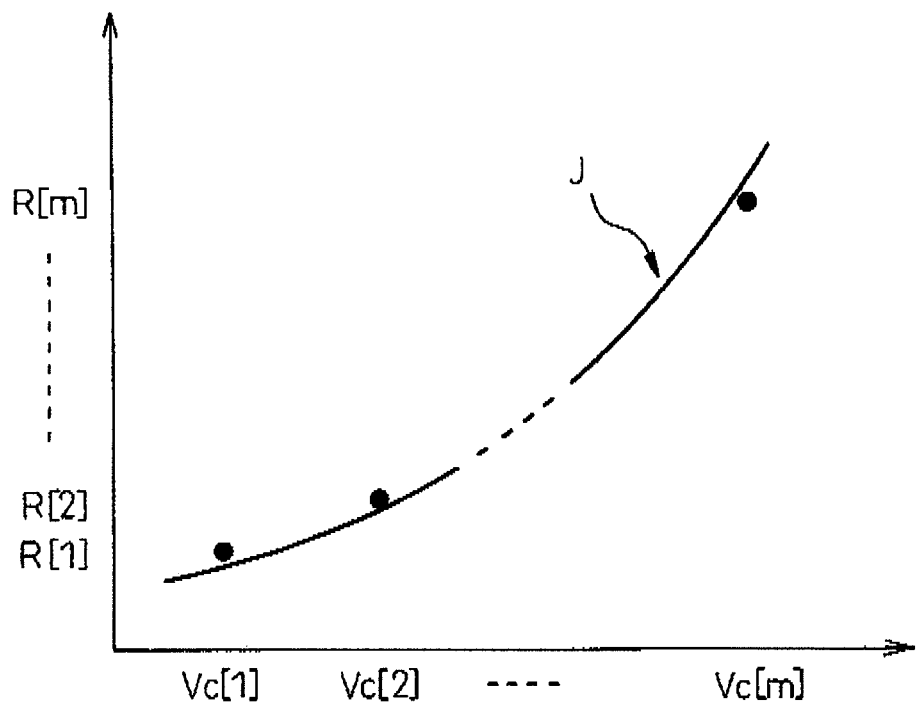
FIG. 14A is an illustration explaining another example of a technique for determining an applicable speed set-value in the closing-speed automatic adjusting process of FIG. 11, and showing a step of preparing a force/speed curve.

Once it is judged, in step U9, that the number of trials of the pressurizing operation reaches the predetermined number "m", the function calculating section 64 (FIG. 10) reads out the speed set-values Vc[1] to Vc[m] and the representative values R[1] to R[m] stored in the memory 40, and calculates the force/speed curve J (FIG. 10) approximately representing a correlativity therebetween (step U10). For example, as shown in FIG. 13A, when the correlation between the speed set-values Vc[1] to Vc[m] and the representative values R[1] to R[m] is subjected to a first-order approximation, a force/speed curve J defined by a linear function can be obtained. Alternatively, as shown in FIG. 14A, when the correlation between the speed set-values Vc[1] to Vc[m] and the representative values R[1] to R[m] is subjected to a second-order approximation, a force/speed curve J defined by a quadratic function can be obtained. Thus, the order of the force/speed curve J can be optionally selected.

In the illustrated example, the pressurizing operation of the welding gun 16 (FIG. 1) for the automatic adjustment is started from the smallest speed set-value Vc[1] (by which the force data Fd[1] exhibits an undershoot response pattern) among the several speed set-values Vc[1] to Vc[m], but the using order of the speed set-values Vc[1] to Vc[m] can be optionally determined. The way for determining the speed set-values Vc[1] to Vc[m] depends on an experimental rule, and it can be understood that the way of determination and the number of trials of the pressurizing operation may affect the accuracy of the closing-speed automatic adjustment. More specifically, when the number of trials "m" is increased, the accuracy of the closing-speed automatic adjustment is improved.

Figure 13B:
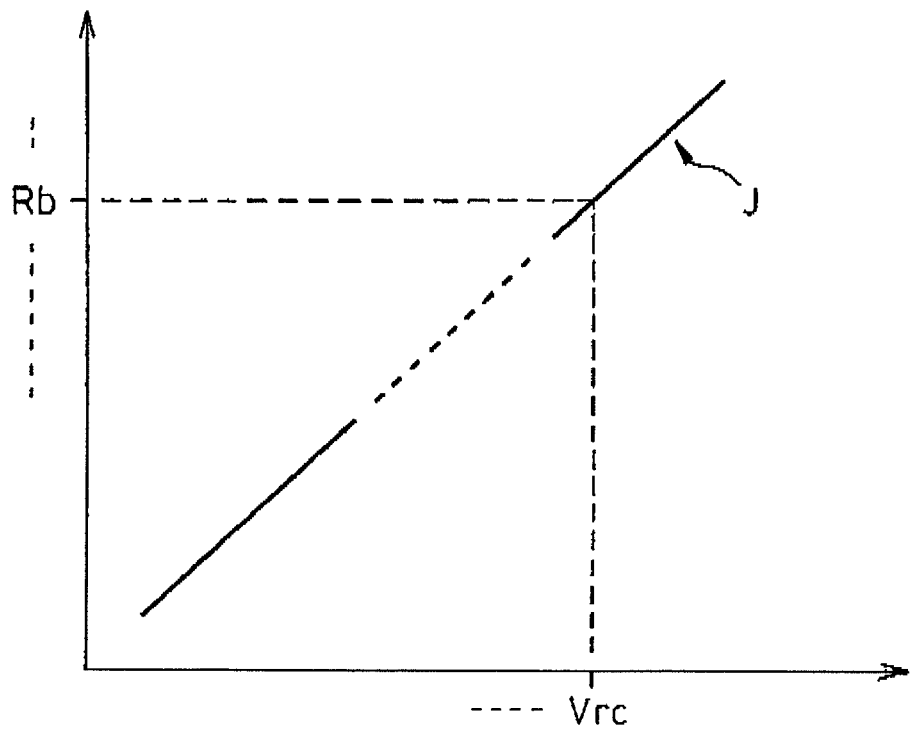
FIG. 13B is an illustration explaining the example of a technique for determining an applicable speed set-value in the closing-speed automatic adjusting process of FIG. 11, and showing a step of determining the applicable speed set-value.
Figure 14B:
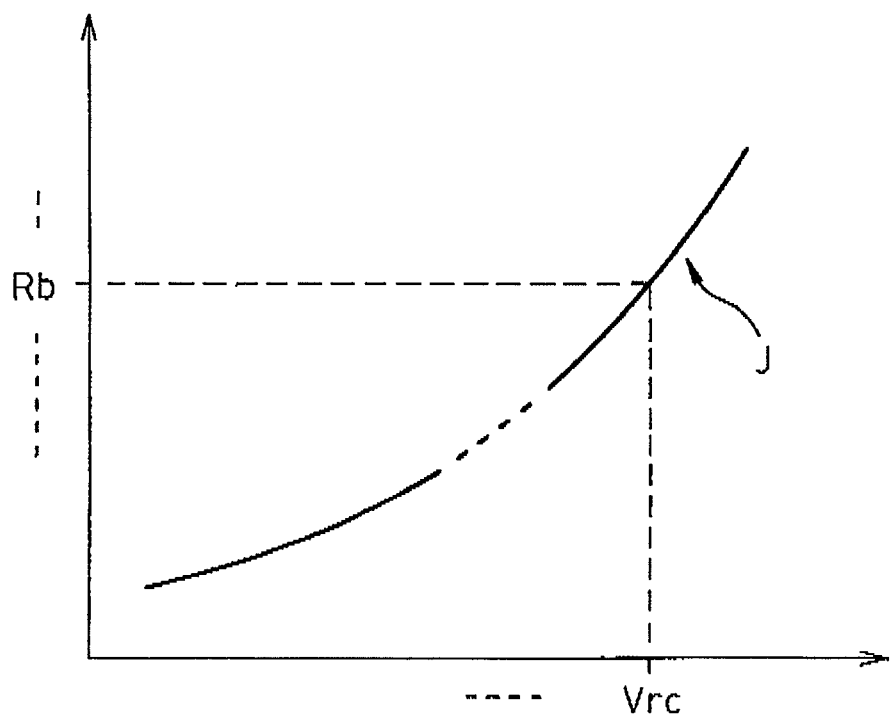
FIG. 14B is an illustration explaining the other example of a technique for determining an applicable speed set-value in the closing-speed automatic adjusting process of FIG. 11, and showing a step of determining the applicable speed set-value.

Once the force/speed curve J is calculated in a manner as described above, the appropriate-value determining section 66 (FIG. 10) determines, as shown in FIGS. 13B and 14B, the applicable speed set-value Vrc (i.e., the appropriate value Vac) corresponding to the previously designated optimal representative value Rb (e.g., the optimal maximum value in an overshoot) (step U13), by using the force/speed curve J. Thus, the closing-speed automatic adjusting process is completed.

As described above, in the closing-speed automatic adjusting process according to the second embodiment, the force/speed curve J, approximately representing the correlativity between the response patterns of the transient data Ftd[1] to Ftd[m] of the several force data Fd[1] to Fd[m] representing, in a time-series manner, the actual pressurizing force F in the electrode pair 14 and the designated speed set-values Vc[1] to Vc[m], is prepared and used for a single welding gun 16, based on various conditions (the speed set-values Vc[1] to Vc[m], the number of trials "m", the optimal representative value Rb) previously determined, depending on an experimental rule, by the manufacturer of the welding gun 16 or the operator of the spot welding system 10, and thereby it is possible to automatically adjust the closing speed of the electrode pair 14 to the appropriate value Vac, without being affected by the individual structural difference or characteristic deterioration with age of the welding gun 16. Although, in the example of FIGS. 13A to 14B, a single applicable speed set-value Vrc corresponding to a single optimal representative value Rb is determined, several optimal representative values Rb may be previously prepared to meet the materials, etc., of the objective workpieces, so as to determine several applicable speed set-values Vrc.

As will be understood from the above description, the welding gun closing-speed automatic adjusting method, according to the present invention, may also be performed in a spot welding system that does not include a robot, by using a dedicated gun motion controller.

As will be apparent from the above description, in a spot welding system according to the present invention, the set-value adjusting section of the gun motion controller automatically adjusts the speed set-value to the appropriate value, and therefore, an operator does not have to manually adjust the closing speed. The set-value adjusting section is also configured such that the force-data obtaining section obtains the force data representing, in a time-series manner, the pressurizing force actually generated in the welding gun 16 and, based on the force data, the appropriate-value computing section determines the appropriate value of the speed set-value, so that the closing-speed automatic adjustment by the gun motion controller can ensure and exhibit a function comparable to that in a conventional technique wherein an operator monitors an actual inter-electrode pressurizing force through an output waveform of a pressure sensor. Therefore, without the need for cumbersome work by the operator to manually fine-tune the closing speed of the electrode pair through a trial and error, the closing speed of the electrode pair can be automatically adjusted to the appropriate value as occasion demands, regardless of types of the welding gun, while accommodating the individual structural difference or characteristic deterioration with age in the welding gun. Further, the appropriate-value computing section of the set-value adjusting section of the gun motion controller determines the appropriate value of the speed set-value based on the pre-convergence transient data in the force data, so that, even when the force data includes the transient data having anyone of an overshoot response pattern and an undershoot response pattern relative to the force target-value, the appropriate value can be determined for the purpose of allowing the response pattern of the transient data to fall within a predetermined tolerable range. Therefore, it is possible to quickly perform the automatic adjustment of the closing speed of the electrode pair to the appropriate value, and thus to improve a welding quality and reduce a welding cycle time. As a result, it is possible to achieve the simplification and acceleration of a system starting-up work.

In a configuration wherein the appropriate-value computing section includes the representative-value calculating section, the comparing and judging section and the regulating section, the speed set-value is changed as occasion demands in such a manner that the response pattern of the transient data of the force data, based on various conditions (speed set-value, representative-value tolerable range) previously determined, depending on an experimental rule, by the manufacturer of the welding gun or the operator of the spot welding system, and thereby it is possible to automatically adjust the closing speed of the electrode pair to the appropriate value, without being affected by the individual structural difference or characteristic deterioration with age of the welding gun.

In a configuration wherein the force-data obtaining section obtains mutually different several sets of force data and the appropriate-value computing section includes the representative-value calculating section, the function calculating section and the appropriate-value determining section, the force/speed curve, approximately representing the correlativity between the response patterns of the transient data of the several sets of force data and the several speed set-values, is prepared and used for a single welding gun, based on various conditions (the several speed set-values, the number of trials, the optimal representative value) previously determined, depending on an experimental rule, by the manufacturer of the welding gun or the operator of the spot welding system, and thereby it is possible to automatically adjust the closing speed of the electrode pair to the appropriate value, without being affected by the individual structural difference or characteristic deterioration with age of the welding gun.

While the invention has been described with reference to specific preferred embodiments, it will be understood, by those skilled in the art, that various changes and modifications may be made thereto without departing from the scope of the following claims.

The invention claimed is:

1. A spot welding system comprising:
   a welding gun provided with an electrode pair actuated, to open or close, by a servo-motor as a drive source;
   a robot carrying either one of said welding gun and a workpiece to be welded, and operating to change relative positions and orientations of said welding gun and said workpiece; and
   a gun motion controller controlling said servo-motor to actuate said electrode pair of said welding gun to open or close;
   said gun motion controller comprising:
   a motion commanding section outputting a motion command to said servo-motor in accordance with a speed set-value designating a closing speed of said electrode pair, so as to allow a pressurizing force exerted by said electrode pair on said workpiece to converge into a previously designated force target-value: and
   a set-value adjusting section automatically adjusting said speed set-value given to said motion commanding section to an appropriate value;
   said set-value adjusting section comprising:
      a force-data obtaining section obtaining force data representing, in a time-series manner, said pressurizing force generated in said electrode pair when said servo-motor actuates said electrode pair to close in accordance with said motion command from said motion commanding section; and
   an appropriate-value computing section determining said appropriate value of said speed set-value based on pre-convergence transient data in said force data obtained by said force-data obtaining section, wherein said appropriate-value computing section comprises:
   a representative-value calculating section calculating, from said pre-convergence transient data in said force data obtained by said force-data obtaining section, a representative value of a response pattern of said pre-convergence transient data;
   a comparing and judging section comparing said representative value calculated by said representative-value calculating section with a representative-value tolerable range previously prepared with reference to said force target-value and judging that, when said representative value is included within said representative-value tolerable range, said speed set-value is said appropriate value and, when said representative value is not included within said representative-value tolerable range, said speed set-value is an inappropriate value; and
   a regulating section acting, based on a judgment of said comparing and judging section, to terminate, when said speed set-value is judged as said appropriate value, an automatic adjusting process for said speed set-value, and to determine, when said speed set-value is judged as said inappropriate value, a second speed set-value different from said speed set-value judged as said inappropriate value and give said second speed set-value to said motion commanding section.

2. A spot welding system as set forth in claim 1, wherein, when said speed set-value is judged as said inappropriate value, said motion commanding section and said set-value adjusting section perform an automatic adjusting process for said second speed set-value determined by said regulating section.

3. A spot welding system as set forth in claim 1, wherein, when said pre-convergence transient data in said force data obtained by said force-data obtaining section includes an overshoot relative to said force target-value, said representative-value calculating section calculates a maximum value of said pre-convergence transient data as said representative value.

4. A spot welding system as set forth in claim 1, wherein, when said pre-convergence transient data in said force data obtained by said force-data obtaining section entirely exhibits an undershoot relative to said force target-value, said representative-value calculating section calculates a value of said pre-convergence transient data, defined at a predetermined time, as said representative value.

5. A spot welding system as set forth in claim 1, further comprising a disturbance observer estimating a disturbance torque applied to said servo-motor, based on a control current value given to said servo-motor and an actual speed measurement value obtained from said servo-motor when said servo-motor actuates said electrode pair to close in accordance with said motion command of said motion commanding section; wherein said force-data obtaining section obtains, as said force data, time-series data of said disturbance torque estimated by said disturbance observer.

6. A spot welding system as set forth in claim 1, further comprising a pressure sensor sensing an actual pressurizing force generated in said electrode pair when said servo-motor actuates said electrode pair to close in accordance with said motion command of said motion commanding section; wherein said force-data obtaining section obtains time-series data of said actual pressurizing force sensed by said pressure sensor as said force data.

7. A spot welding system as set forth in claim 1, further comprising a robot controller for controlling said robot; wherein said gun motion controller comprises a part of functions of said robot controller.

8. A spot welding system comprising:
   a welding gun provided with an electrode pair actuated, to open or close, by a servo-motor as a drive source;
   a robot carrying either one of said welding gun and a workpiece to be welded, and operating to change relative positions and orientations of said welding gun and said workpiece; and
   a gun motion controller controlling said servo-motor to actuate said electrode pair of said welding gun to open or close;
   said gun motion controller comprising:
   a motion commanding section outputting a motion command to said servo-motor in accordance with a speed set-value designating a closing speed of said electrode pair, so as to allow a pressurizing force exerted by said electrode pair on said workpiece to converge into a previously designated force target-value: and
   a set-value adjusting section automatically adjusting said speed set-value given to said motion commanding section to an appropriate value;
   said set-value adjusting section comprising:
      a force-data obtaining section obtaining force data representing, in a time-series manner, said pressurizing force generated in said electrode pair when said servo-motor actuates said electrode pair to close in accordance with said motion command from said motion commanding section; and
   an appropriate-value computing section determining said appropriate value of said speed set-value based on pre-convergence transient data in said force data obtained by said force-data obtaining section, wherein said force-data obtaining section obtains mutually different several sets of said force data representing, in a time-series manner, said pressurizing force generated in said electrode pair when said motion commanding section puts said servo-motor into operation to actuate said electrode pair to close in accordance with mutually different several speed set-values previously prepared in connection with a single force target-value; and wherein said appropriate-value computing section comprises:

a representative-value calculating section calculating, from several sets of said pre-convergence transient data in said several sets of force data obtained by said force-data obtaining section, several representative values representing response patterns of said several sets of pre-convergence transient data;

a function calculating section calculating a force/speed curve representing a correlativity between said several representative values calculated by said representative-value calculating section and said several speed set-values corresponding to said several representative values; and an appropriate-value determining section determining an applicable speed set-value as said appropriate value, by using said force/speed curve calculated by said function calculating section, said applicable speed set-value corresponding to an optimal representative value previously prepared with reference to said force target-value, and giving said applicable speed set-value to said motion commanding section.

9. A spot welding system as set forth in claim 8, wherein, when at least one of said several sets of pre-convergence transient data in said several sets of force data obtained by said force-data obtaining section includes an overshoot relative to said force target-value, said representative-value calculating section calculates a maximum value of each of said at least one of said several sets of pre-convergence transient data including said overshoot as at least one of said representative values.

10. A spot welding system as set forth in claim 8, wherein, when at least one of said several sets of pre-convergence transient data in said several sets of force data obtained by said force-data obtaining section entirely exhibits an undershoot relative to said force target-value, said representative-value calculating section calculates a value of each of said at least one of said several sets of said pre-convergence transient data exhibiting said undershoot, defined at a predetermined time, as at least one of said representative values.

11. A method for adjusting a closing speed of an electrode pair provided in a welding gun, said electrode pair actuated, to open or close, by a servo-motor as a drive source, said method comprising:

preparing a speed set-value designating a closing speed of said electrode pair;

putting said servo-motor into operation to actuate said electrode pair to close, in accordance with said speed set-value;

obtaining force data representing, in a time-series manner, a pressurizing force generated in said electrode pair when said servo-motor actuates said electrode pair to close; and determining an appropriate value of said speed set-value based on pre-convergence transient data in said force data, wherein determining said appropriate value of said speed set-value comprises:

preparing a representative-value tolerable range set with reference to a force target-value of a pressurizing force exerted by said electrode pair on a workpiece to be welded;

calculating, from said pre-convergence transient data in said force data, a representative value of a response pattern of said pre-convergence transient data;

comparing said representative value with said representative-value tolerable range and judging that, when said representative value is included within said representative-value tolerable range, said speed set-value is said appropriate value and, when said representative value is not included within said representative-value tolerable range, said speed set-value is an inappropriate value; and terminating, when said speed set-value is judged as said appropriate value, an automatic adjusting process for said speed set-value, and determining, when said speed set-value is judged as said inappropriate value, a second speed set-value different from said speed set-value judged as said inappropriate value.

12. A method for adjusting, as set forth in claim 11, further comprising, when said speed set-value is judged as said inappropriate value, performing an automatic adjusting process for said second speed set-value.

13. A method for adjusting a closing speed of an electrode pair provided in a welding gun, said electrode pair actuated, to open or close, by a servo-motor as a drive source, said method comprising:

preparing a speed set-value designating a closing speed of said electrode pair;

putting said servo-motor into operation to actuate said electrode pair to close, in accordance with said speed set-value;

obtaining force data representing, in a time-series manner, a pressurizing force generated in said electrode pair when said servo-motor actuates said electrode pair to close; and determining an appropriate value of said speed set-value based on pre-convergence transient data in said force data, wherein preparing said speed set-value comprises preparing mutually different several speed set-values designating closing speeds of said electrode pair in connection with a single force target-value of said pressurizing force exerted by said electrode pair on said workpiece; wherein obtaining said force data comprises obtaining mutually different several sets of force data representing, in a time-series manner, said pressurizing force generated in said electrode pair when said servo-motor actuates said electrode pair to close in accordance with said several speed set-values; and wherein determining said appropriate value of said speed set-value comprises:

preparing an optimal representative value set with reference to said force target-value;

calculating, from several sets of said pre-convergence transient data in said several sets of force data, several representative values representing response patterns of said several sets of pre-convergence transient data;

calculating a force/speed curve representing a correlativity between said several representative values and said several speed set-values corresponding to said several representative values; and determining an applicable speed set-value as said appropriate value, by using said force/speed curve, said applicable speed set-value corresponding to said optimal representative value.

* * * * *